(12) United States Patent
Teraoka et al.

(10) Patent No.: US 9,984,400 B2
(45) Date of Patent: May 29, 2018

(54) NETWORK APPARATUS AND METHOD FOR CONTROL OF AN ELECTRONIC DATA EXCHANGE BETWEEN PROVIDER TERMINAL AND USER TERMINAL BASED ON FACTOR INFORMATION

(71) Applicant: YAHOO JAPAN CORPORATION, Tokyo (JP)

(72) Inventors: Teruhiko Teraoka, Tokyo (JP); Hidehito Gomi, Tokyo (JP); Kota Tsubouchi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 881 days.

(21) Appl. No.: 14/483,888

(22) Filed: Sep. 11, 2014

(65) Prior Publication Data
US 2015/0149322 A1 May 28, 2015

(30) Foreign Application Priority Data
Nov. 26, 2013 (JP) ................................. 2013-244410

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0617* (2013.01); *G06Q 30/0283* (2013.01)

(58) Field of Classification Search
CPC .................................................... G06Q 30/06
(Continued)

(56) References Cited

U.S. PATENT DOCUMENTS 7,778,885 B1 * 8/2010 Semprevivo ........... G06Q 30/02
705/26.1
2006/0195385 A1 * 8/2006 Khetrapal .............. G06Q 30/02
705/37
(Continued)

FOREIGN PATENT DOCUMENTS

JP 2000-250980 A 9/2000
JP 2001-290956 A 10/2001
(Continued)

OTHER PUBLICATIONS

"Privacy by Design," First Version, pp. 10-43, Oct. 29, 2012.
(Continued)

*Primary Examiner* — Mila Airapetian
(74) *Attorney, Agent, or Firm* — Oliff PLC

(57) ABSTRACT

An information processing apparatus, method, and program that control an electronic data exchange. The apparatus, method, and program involve receiving user information on an information provider or a provider terminal from the provider terminal used by the information provider. The user information received is stored in a memory. In the case of accepting an acquisition request for the user information from a user terminal used by an information user, the system controls whether to provide the user information corresponding to the acquisition request to the user terminal and transmits a reward to the information provider which is a transmission source of the provided user information based on factor information which affects a value of the user information stored.

13 Claims, 12 Drawing Sheets

(58) Field of Classification Search
USPC ........................................................ 705/26.1
See application file for complete search history.

(56) References Cited

U.S. PATENT DOCUMENTS

2012/0239586 A1* 9/2012 Peloso ............... G06Q 30/0279
705/329
2014/0046723 A1* 2/2014 Clark ................. G06Q 30/0201
705/7.29

FOREIGN PATENT DOCUMENTS

| | | |
|---|---|---|
| JP | A-2002-56111 | 2/2002 |
| JP | 2002-149946 A | 5/2002 |
| JP | 2002-269222 A | 9/2002 |
| JP | 2003-288468 A | 10/2003 |
| JP | A-2003-316908 | 11/2003 |
| JP | 2004-258872 A | 9/2004 |
| JP | 2005-243010 A | 9/2005 |
| JP | 2006-146858 A | 6/2006 |
| JP | 2006-350813 A | 12/2006 |
| JP | 2008-304964 A | 12/2008 |
| JP | 2009-81865 A | 4/2009 |
| JP | 2010-113387 A | 5/2010 |
| WO | 2014/123651 A1 | 8/2014 |

OTHER PUBLICATIONS

Sep. 15, 2015 Office Action issued in Japanese Patent Application No. 2013-244410.
Jan. 16, 2018 Office Action issued in Japanese Patent Application No. 2016-037283.

* cited by examiner

FIG.4

| ACQUISITION DATE AND TIME | PRO-VIDER IDEN-TIFIER | USER INFORMATION ||||||||||
|---|---|---|---|---|---|---|---|---|---|---|---|
| | | POSITION INFORMATION || ATMOSPHERIC PRESSURE INFORMATION || SOUND COLLECTION INFORMATION || ILLUMINANCE INFORMATION || GRADIENT INFORMATION ||
| | | VALUE | PRO-VIDING COUNT | VALUE | PRO-VIDING COUNT | VALUE | PRO-VIDING COUNT | VALUE | PRO-VIDING COUNT | VALUE | PRO-VIDING COUNT |
| ... | ... | ... | ... | ... | ... | ... | ... | ... | ... | ... | ... |
| 2013/11/1 12:00:00 | U01 | A01 | 3 | B01 | 1 | C01 | 3 | D01 | 1 | E01 | 1 |
| 2013/11/1 12:00:00 | U02 | A02 | 1 | - | - | C02 | 1 | - | - | - | - |
| 2013/11/1 12:00:00 | U03 | A03 | 1 | - | - | C03 | 1 | - | - | - | - |
| 2013/11/1 12:00:00 | U04 | A04 | 1 | - | - | - | - | - | - | E04 | 1 |
| 2013/11/1 12:00:00 | U05 | A05 | 1 | - | - | C05 | 1 | - | - | - | - |
| 2013/11/1 12:05:00 | U01 | A06 | 2 | B06 | 1 | C06 | 2 | D06 | 1 | E06 | 1 |
| 2013/11/1 12:05:00 | U03 | A07 | 1 | - | - | C07 | 1 | - | - | - | - |
| 2013/11/1 12:05:00 | U04 | A08 | 1 | - | - | - | - | - | - | E08 | 1 |
| 2013/11/1 12:10:00 | U01 | A09 | 2 | B09 | 1 | C09 | 2 | D09 | 1 | E09 | 1 |
| ... | ... | ... | ... | ... | ... | ... | ... | ... | ... | ... | ... |

<table>
<tr><th rowspan="3">ACQUISITION DATE AND TIME</th><th colspan="8">USER INFORMATION 221</th></tr>
<tr><th rowspan="2">PROVIDER IDENTIFIER</th><th colspan="3">POSITION INFORMATION</th><th colspan="4">ATMOSPHERIC PRESSURE INFORMATION</th><th rowspan="2">...</th></tr>
<tr><th>VALUE</th><th>ACCU-RACY</th><th>GRANU-LARITY</th><th>RARITY</th><th>VALUE</th><th>ACCU-RACY</th><th>GRANU-LARITY</th><th>RARITY</th></tr>
<tr><td>...</td><td>...</td><td>...</td><td>...</td><td>...</td><td>...</td><td>...</td><td>...</td><td>...</td><td>...</td><td>...</td></tr>
<tr><td>2013/11/1 12:00:00</td><td>U01</td><td>A01</td><td>3</td><td>3</td><td>5</td><td>B01</td><td>3</td><td>3</td><td>5</td><td>...</td></tr>
<tr><td>2013/11/1 12:00:00</td><td>U02</td><td>A02</td><td>3</td><td>3</td><td>3</td><td>—</td><td>—</td><td>—</td><td>—</td><td>...</td></tr>
<tr><td>2013/11/1 12:00:00</td><td>U03</td><td>A03</td><td>3</td><td>3</td><td>3</td><td>—</td><td>—</td><td>—</td><td>—</td><td>...</td></tr>
<tr><td>2013/11/1 12:00:00</td><td>U04</td><td>A04</td><td>5</td><td>3</td><td>4</td><td>—</td><td>—</td><td>—</td><td>—</td><td>...</td></tr>
<tr><td>2013/11/1 12:00:00</td><td>U05</td><td>A05</td><td>4</td><td>3</td><td>3</td><td>—</td><td>—</td><td>—</td><td>—</td><td>...</td></tr>
<tr><td>2013/11/1 12:05:00</td><td>U01</td><td>A06</td><td>3</td><td>4</td><td>3</td><td>B06</td><td>4</td><td>2</td><td>3</td><td>...</td></tr>
<tr><td>2013/11/1 12:05:00</td><td>U03</td><td>A07</td><td>2</td><td>4</td><td>2</td><td>—</td><td>—</td><td>—</td><td>—</td><td>...</td></tr>
<tr><td>2013/11/1 12:05:00</td><td>U04</td><td>A08</td><td>3</td><td>2</td><td>3</td><td>—</td><td>—</td><td>—</td><td>—</td><td>...</td></tr>
<tr><td>2013/11/1 12:10:00</td><td>U01</td><td>A09</td><td>1</td><td>4</td><td>4</td><td>B09</td><td>2</td><td>4</td><td>3</td><td>...</td></tr>
<tr><td>...</td><td>...</td><td>...</td><td>...</td><td>...</td><td>...</td><td>...</td><td>...</td><td>...</td><td>...</td><td>...</td></tr>
</table>

| PROVIDER IDENTIFIER | PROVIDING COUNT | PROVIDER RANK |
|---|---|---|
| U01 | 200 | 5 |
| U02 | 140 | 3 |
| U03 | 20 | 1 |
| ... | ... | ... |

| USER IDENTIFIER | USING COUNT | USER RANK |
|---|---|---|
| R01 | 15 | 5 |
| R02 | 3 | 2 |
| R03 | 7 | 3 |
| ... | ... | ... |

FIG.14

| PROVIDER IDENTIFIER | USER INFORMATION ||||||||
|---|---|---|---|---|---|---|---|---|
| | POSITION INFORMATION |||| ATMOSPHERIC PRESSURE INFORMATION ||||
| | STATE | ACQUISITION PERIOD | ACQUISITION FREQUENCY | PROVIDING COUNT | STATE | ACQUISITION PERIOD | ACQUISITION FREQUENCY | PROVIDING COUNT |
| U01 | EXISTENCE | IN 2013 | EVERY 30 MINUTES | 30 | EXISTENCE | IN 2013 | EVERYDAY | 10 |
| U02 | EXISTENCE | APRIL THROUGH DECEMBER IN 2013 | EVERY 12 HOURS | 15 | NON-EXISTENCE | — | — | — |
| U03 | EXISTENCE | 2012 OR LATER | EVERY ONE HOUR | 18 | NON-EXISTENCE | — | — | — |
| U04 | EXISTENCE | IN 2013 | EVERY 2 HOURS | 20 | NON-EXISTENCE | — | — | — |
| U05 | EXISTENCE | IN 2012 | EVERY 6 HOURS | 15 | NON-EXISTENCE | — | — | — |
| ... | ... | ... | ... | ... | ... | ... | ... | ... |

421

NETWORK APPARATUS AND METHOD FOR CONTROL OF AN ELECTRONIC DATA EXCHANGE BETWEEN PROVIDER TERMINAL AND USER TERMINAL BASED ON FACTOR INFORMATION

CROSS-REFERENCE TO RELATED APPLICATIONS

The present application claims priority to and incorporates by reference the entire contents of Japanese Patent Application No. 2013-244410 filed in Japan on Nov. 26, 2013.

BACKGROUND OF THE INVENTION

1. Field of the Invention

The present invention relates to an information transaction apparatus, an information transaction method, and an information transaction program.

2. Description of the Related Art

In the related art, known are techniques for transacting personal information through a network such as the Internet. For example, known is a technique where an internet service provider allows a user to specify personal information to be public accessible or non-public accessible, provides only the personal information which is specified to be public accessible to companies with fees, and rewards the user with a portion of profits gained from the companies.

However, in the related art described above, both of the information provider and the information user may not gain appropriate profits. More specifically, the related art described above is merely to perform proving the personal information with fees. Therefore, the information user may not obtain the personal information appropriate for the paid fees. In addition, the information provider may not gain the reward appropriate for the providing of the personal information. Accordingly, in the related art described above, both of the information provider and the information user may not gain appropriate profits.

The present application has been made considering the above situation, and is to provide an information transaction apparatus, an information transaction method, and an information transaction program capable of allowing both of an information provider and an information user to gain appropriate profits.

SUMMARY OF THE INVENTION

According to one or more embodiments of the present application, an apparatus includes a network interface, a memory, and a processor. The network interface is connected to both a provider terminal used by the information provider and a user terminal used by an information user so that the apparatus is configured to communicate with the provider terminal and the user terminal. The processor is configured to: receive user information on the information provider or the provider terminal; store the user information received in memory; receive, from the user terminal, an acquisition request for the user information; and in the case of accepting the acquisition request, control whether the user information corresponding to the acquisition request is provided to the user terminal and transmit a reward to the information provider which is a transmission source of the provided user information based on factor information which affects a value of the user.

The above and other objects, features, advantages and technical and industrial significance of the embodiment of the present application will be better understood by reading the following detailed description of embodiments of the present application, when considered in connection with the accompanying drawings.

BRIEF DESCRIPTION OF THE DRAWINGS

FIG. 4 is a diagram illustrating an example of a user information memory unit according to the first embodiment;

FIG. 8 is a diagram illustrating an example of a user information memory unit according to the second embodiment;

FIG. 10 is a diagram illustrating an example of a provider information memory unit according to the third embodiment;

FIG. 11 is a diagram illustrating an example of a user information memory unit according to the third embodiment;

FIG. 14 is a diagram illustrating an example of a user information memory unit according to the fourth embodiment.

DETAILED DESCRIPTION OF THE PREFERRED EMBODIMENTS

Figure 1:
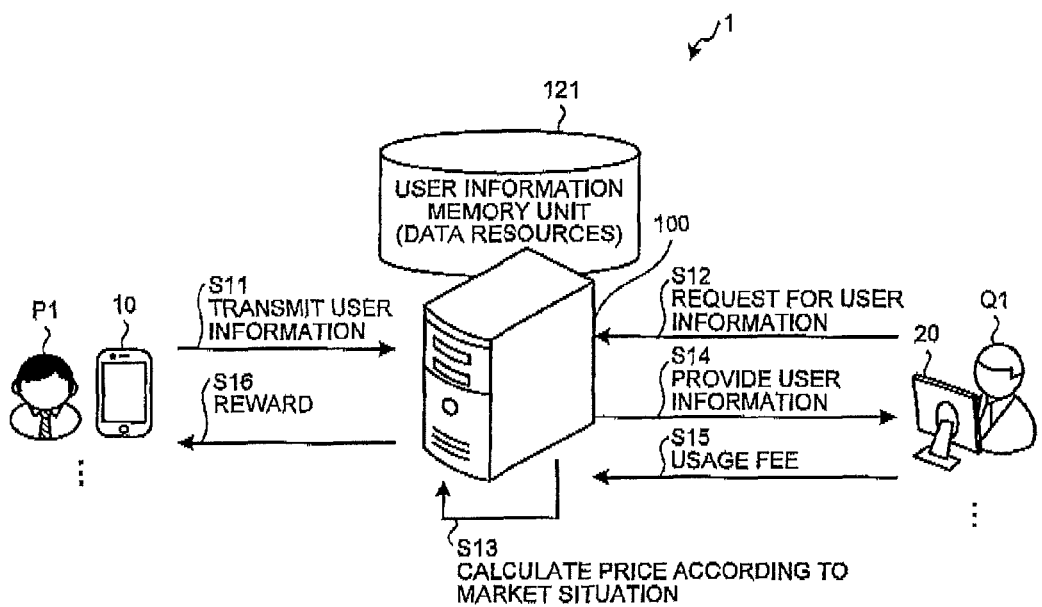
FIG. 1 is a diagram illustrating an example of an information transaction process according to a first embodiment.

Hereinafter, aspects (hereinafter, referred to as embodiments) for embodying an information transaction apparatus, an information transaction method, and an information transaction program according to the present application will be described in detail with reference to the drawings. In addition, the information transaction apparatus, the information transaction method, and the information transaction program according to the present application are not limited by the embodiments. In addition, in the embodiment hereinafter, the same components are denoted by the same reference numerals, and redundant description is omitted.

First Embodiment

1. Information Transaction Process

First, an example of an information transaction process according to a first embodiment will be described with reference to FIG. 1. FIG. 1 is a diagram illustrating an example of the information transaction process according to the first embodiment. In FIG. 1, the information transaction process will be described by exemplifying an information distribution system 1.

As illustrated in FIG. 1, the information distribution system 1 is configured to include a provider terminal 10, a user terminal 20, and an information transaction apparatus 100. The information transaction apparatus 100 is communicably connected to the provider terminal 10 and the user terminal 20 via a network (not illustrated) (for example, the Internet). Although FIG. 1 illustrates one provider terminal 10 and one user terminal 20, two or more provider terminals 10 or two or more user terminals 20 may be included in the information distribution system 1.

The provider terminal 10 is an information processing apparatus used by an information provider P1. The user terminal 20 is an information processing apparatus used by an information user Q1. The provider terminal 10 and the user terminal 20 are, for example, mobile terminals such as a smart phone, a tablet terminal, or a personal digital assistant (PDA), desktop personal computers (PCs), notebook PCs, or the like. In the case of the example of FIG. 1, the provider terminal 10 is assumed to be a mobile terminal.

The information provider P1 is a general user having, for example, a smart phone or the like and gains a profit by providing user information to the information user Q1 for a fee. The information user Q1 is, for example, a company, an organization, or the like which analyzes user information purchased from the information provider P1 or the like.

The information transaction apparatus 100 is a server apparatus which performs the information transaction process. More specifically, as described hereinafter, the information transaction apparatus 100 performs the transaction process for the user information between the information provider P1 and the information user Q1.

In the example illustrated in FIG. 1, the provider terminal 10 transmits the user information to the information transaction apparatus 100 (step S11). Herein, the user information denotes information on the provider terminal 10 or information on the information provider P1. As described later in detail, the user information corresponds to, for example, position information or the like acquired by the provider terminal 10.

Next, the information transaction apparatus 100 stores the user information received from the provider terminal 10 to the user information memory unit 121. The information transaction apparatus 100 also receives user information from other provider terminals (not illustrated in FIG. 1) besides the provider terminal 10 and stores the received user information as data resources in the user information memory unit 121.

Subsequently, the user terminal 20 transmits an acquisition request for the user information to the information transaction apparatus 100 according to operation of the information user Q1 (step S12).

Next, in a case where the information transaction apparatus 100 accepts the acquisition request from the user terminal 20, the information transaction apparatus 100 calculates a price of the user information corresponding to the acquisition request based on factor information representing factors which affect a value of the user information stored in the user information memory unit 121. In the example of FIG. 1, the information transaction apparatus 100 uses a market situation of the user information as an example of the factor information and calculates the price based on the market situation (step S13). Herein, the market situation corresponds to, for example, needs (in other words, a degree of popularity) for the user information at the current moment, which is requested by the information user Q1. For example, the information transaction apparatus 100 calculates the prices to be higher as the needs for the user information requested by the information user Q1 become higher and calculates the prices to be lower as the needs for the user information become lower.

Next, the information transaction apparatus 100 provides the user information accepted in step S12 to the user terminal 20 (step S14). At this time, the information transaction apparatus 100 may notify the price calculated in step S13 to the user terminal 20. In addition, after notifying the price to the user terminal 20, in the case of receiving a reply indicating approval of payment of the price from the user terminal 20, the information transaction apparatus 100 may provide the user information to the user terminal 20.

After that, the information user Q1 pays the price as a usage fee of the user information calculated in step S13 to a manager or the like of the information transaction apparatus 100 (step S15). Next, the manager or the like of the information transaction apparatus 100 pays, as a reward, a portion or all of the usage fee gained from the information user Q1 to the information provider P1 which is a transmission source of the user information provided to the user terminal 20 in step S14 (step S16).

In this manner, the information transaction apparatus 100 according to the first embodiment calculates the price of the user information according to the factor information (in the example of FIG. 1, market situation) which affects the value of the user information provided to the information user Q1. Therefore, the information transaction apparatus 100 may calculate the price to be higher as the value of the user information becomes higher. Accordingly, it is possible for the information transaction apparatus 100 to provide the user information appropriate for the price to the information user Q1. In addition, it is possible for the information transaction apparatus 100 to pay the reward appropriate for the value of the user information to the information provider P1. According to the configuration, it is possible for the information transaction apparatus 100 according to the first embodiment to allow both of the information provider P1 and the information user Q1 to gain appropriate profits. This promotes an increase in the number of users (information providers P1 and information users Q1) of the information transaction apparatus 100. As a result, it is possible for the information transaction apparatus 100 to store a large number of pieces of the user information in the user information memory unit 121 and to promote distribution of the user information.

2. Configuration of Provider Terminal

Figure 2:
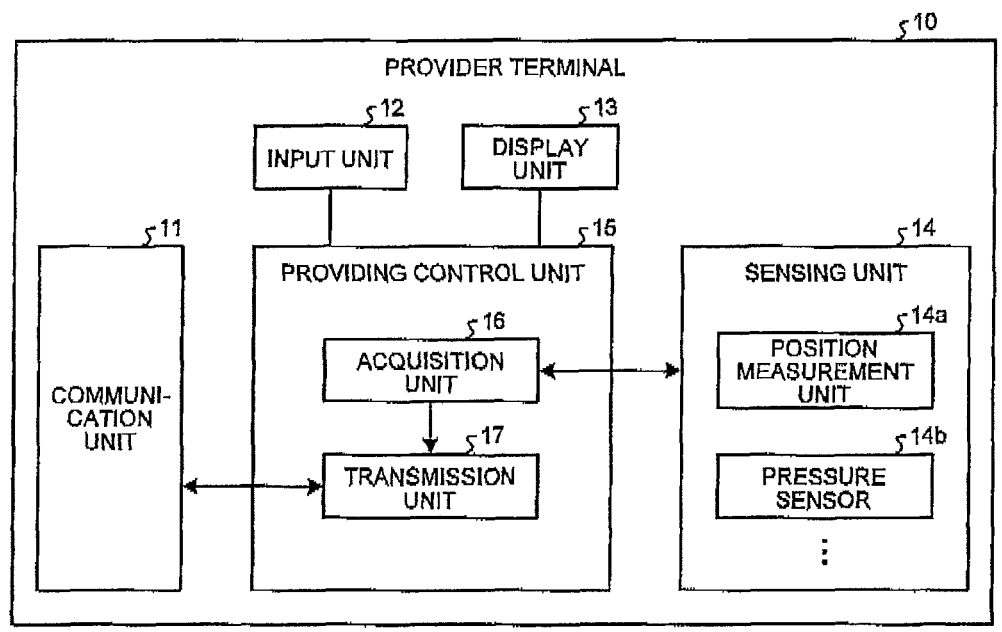
FIG. 2 is a diagram illustrating a configuration example of a provider terminal according to the first embodiment.

Next, a configuration of the provider terminal 10 according to the first embodiment will be described with reference to FIG. 2. FIG. 2 is a diagram illustrating a configuration example of the provider terminal 10 according to the first embodiment. As illustrated in FIG. 2, the provider terminal 10 is configured to include a communication unit 11, an input unit 12, a display unit 13, a sensing unit 14, and a providing control unit 15.

The communication unit 11 is connected to a network in a wired or wireless manner to communicate information with the information transaction apparatus 100. For example, the communication unit 11 is embodied by using a network interface card (NIC) or the like.

The input unit 12 is an input device for receiving various operations from a user. For example, the input unit 12 is embodied by using hard keys or the like which are installed on a sidewall or the like of the provider terminal 10. The display unit 13 is a display device for displaying various types of information. For example, the display unit 13 is embodied by using a liquid crystal display or the like. In addition, in a case where a touch panel is employed in the provider terminal 10, a portion of the input unit 12 and the display unit 13 are integrated.

The sensing unit 14 senses various types of information on the provider terminal 10. More specifically, the sensing unit 14 senses a physical state of the provider terminal 10 as the user information. In the example illustrated in FIG. 2, the sensing unit 14 is configured to include a position measurement unit 14a and a pressure sensor 14b.

The position measurement unit 14a acquires the current position of the provider terminal 10. More specifically, the position measurement unit 14a receives radio waves emitted from global positioning system (GPS) satellites and acquires position information (for example, a latitude and a longitude) indicating the current position of the provider terminal 10 based on the received radio waves. The pressure sensor 14b senses the atmospheric pressure around the provider terminal 10.

In addition, the sensing unit 14 is not limited to the position measurement unit 14a and the pressure sensor 14b, but it may include various devices for sensing the physical states of the provider terminal 10. For example, the sensing unit 14 may include a microphone for collecting sound around the provider terminal 10, an illuminance sensor for sensing illuminance around the provider terminal 10, an acceleration sensor (or a gyro sensor or the like) for sensing physical motion of the provider terminal 10, a humidity sensor for sensing humidity around the provider terminal 10, a geomagnetic sensor for sensing a geomagnetic field at a location position of the provider terminal 10, or the like. In addition, the sensing unit 14 may be configured to include a microphone, an illuminance sensor, a humidity sensor, a geomagnetic sensor, or the like without having the position measurement unit 14a or the pressure sensor 14b.

The providing control unit 15 is embodied, for example, by a central processing unit (CPU), a micro processing unit (MPU), or the like executing various programs stored in a memory device inside the provider terminal 10 in a random access memory (RAM) as a work area. In addition, the providing control unit 15 is embodied, for example, by using an integrated circuit such as an application specific integrated circuit (ASIC), a field programmable gate array (FPGA), or the like.

The providing control unit 15 controls a process for providing the user information to the information transaction apparatus 100. For example, the providing control unit 15 controls execution of an information providing application for implementing the process of providing the user information. The information providing application may be installed in the provider terminal 10 in advance or may be downloaded from a server apparatus (for example, the information transaction apparatus 100 or a server apparatus which provides various applications) to be installed in the provider terminal 10 according to operation of an information provider carrying the provider terminal 10.

As illustrated in FIG. 2, the providing control unit 15 is configured to include an acquisition unit 16 and a transmission unit 17 to implement or execute functions or operations of the information process described hereinafter. For example, the providing control unit 15 implements the acquisition unit 16 and the transmission unit 17 by executing the above-described information providing application by using the RAM as a work area. In addition, the internal configuration of the providing control unit 15 is not limited to the configuration illustrated in FIG. 2, but any other configurations which perform the information process described hereinafter may be used. In addition, a connection relation between processing units included in the providing control unit 15 is not limited to the connection relation illustrated in FIG. 2, but other connection relations may be used.

The acquisition unit 16 acquires the user information. More specifically, the acquisition unit 16 acquires various types of information sensed by the sensing unit 14 as the user information by controlling the sensing unit 14. For example, the acquisition unit 16 acquires the position information indicating the current position of the provider terminal 10 as the user information by controlling the position measurement unit 14a. In addition, for example, the acquisition unit 16 acquires the atmospheric pressure information indicating the atmospheric pressure around the provider terminal 10 as the user information by controlling the pressure sensor 14b.

In addition, the present invention is not limited to the above-described examples, but the acquisition unit 16 acquires various types of the user information from respective devices according to the respective devices such as sensors included in the sensing unit 14. For example, in a case where the sensing unit 14 is configured to include a microphone, the acquisition unit 16 acquires sound collection information indicating an intensity of sound collected by the microphone as the user information. In addition, in a case where the sensing unit 14 is configured to include an illuminance sensor, the acquisition unit 16 acquires illuminance information indicating illuminance around the provider terminal 10 as the user information. In addition, in a case where the sensing unit 14 is configured to include an acceleration sensor, the acquisition unit 16 acquires gradient information indicating gradient of the provider terminal 10 as the user information. In addition, in a case where the sensing unit 14 is configured to include a humidity sensor, the acquisition unit 16 acquires humidity information indicating humidity around the provider terminal 10 as the user information. In addition, in a case where the sensing unit 14 is configured to include a geomagnetic sensor, the acquisition unit 16 acquires geomagnetic field information indicating a geomagnetic field at a location position of the provider terminal 10 as the user information.

In addition, the type of the user information acquired by the acquisition unit 16 may be set by the information provider. More specifically, even in a case where the provider terminal 10 has a function of acquiring plural types of the user information, the information provider may set the type of the user information which is to be acquired by the acquisition unit 16. For example, the information provider may set, as an acquisition object, only the type of the user information which is allowed to be distributed to information users among the pieces of the user information which may be divided into the types of position information, atmospheric pressure information, sound collection information, illuminance information, gradient information, humidity information, geomagnetic field information, and the like. Next, the acquisition unit 16 acquires only the user information corresponding to the type set by the information provider.

In addition, timings when the acquisition unit 16 acquires various types of the user information are determined by the providing control unit 15 in advance. For example, the acquisition unit 16 acquires various types of the user information described above periodically (every five minutes, every 10 minutes, every one hour, every day, every week, or the like). In addition, timings when the acquisition unit 16 acquires various types of the user information may be set by the information provider carrying the provider terminal 10. For example, the acquisition unit 16 acquires various types of the user information described above at every predetermined date and time set by the information provider. In addition, the information provider may set an acquisition timing of the user information according to each type of the user information.

The transmission unit 17 transmits the user information acquired by the acquisition unit 16 to the information transaction apparatus 100. For example, the transmission unit 17 transmits a provider identifier for identifying the provider terminal 10 or the information provider, the user information acquired by the acquisition unit 16, and the acquisition date the time when the user information is acquired by the acquisition unit 16 to the information transaction apparatus 100. At this time, the transmission unit 17 may transmit the user information and the like to the information transaction apparatus 100 every time when the user information is acquired by the acquisition unit 16 or may transmit the user information and the like to the information transaction apparatus 100 at every predetermined time period or the like.

3. Configuration of Information Transaction Apparatus

Figure 3:
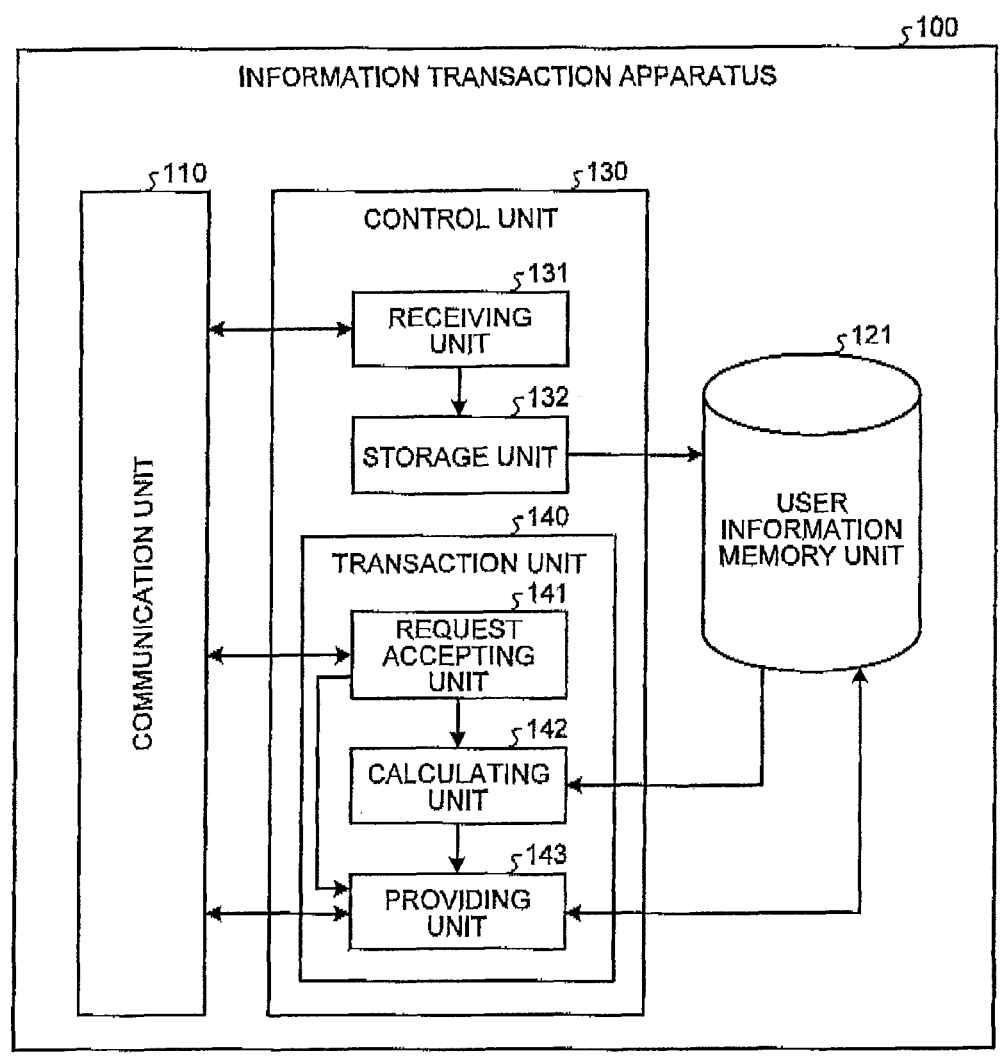
FIG. 3 is a diagram illustrating a configuration example of an information transaction apparatus according to the first embodiment.

Next, a configuration of the information transaction apparatus 100 according to the first embodiment will be described with reference to FIG. 3. FIG. 3 is a diagram illustrating a configuration example of the information transaction apparatus 100 according to the first embodiment. As illustrated in FIG. 3, the information transaction apparatus 100 is configured to include a communication unit 110, a user information memory unit 121, and a control unit 130.

The communication unit 110 is connected to a network in a wired or wireless manner to communicate information with the provider terminal 10 and the user terminal 20. For example, the communication unit 110 is embodied by using an NIC or the like.

The user information memory unit 121 is embodied by using, for example, a semiconductor memory device such as a RAM or a flash memory or a memory device such as a hard disk or an optical disk. The user information memory unit 121 stores the user information provided from the provider terminal 10. Herein, an example of the user information memory unit 121 according to the first embodiment is illustrated in FIG. 4. In the example illustrated in FIG. 4, the user information memory unit 121 has items of "acquisition date and time", "provider identifier", and "user information".

The "acquisition date and time" represents the date and time when the user information is acquired. For example, the "acquisition date and time" corresponds to the acquisition date and time transmitted together with the user information by the transmission unit 17 of the provider terminal 10. The "provider identifier" represents identification information for identifying the provider terminal 10 or the information provider which transmits the user information. For example, the "provider identifier" corresponds to the provider identifier which is transmitted together with the user information by the transmission unit 17 of the provider terminal 10.

The "user information" represents the user information received from the provider terminal 10. In the case of the example of FIG. 4, the "user information" may be divided into the types of the "position information", the "atmospheric pressure information", the "sound collection information", the "illuminance information", and the "gradient information". The "position information", the "atmospheric pressure information", the "sound collection information", the "illuminance information", and the "gradient information" represent the various types of the user information sensed by the sensing unit 14 of the provider terminal 10 described above. In addition, the user information may be divided into items of "value" and "providing count" for each type. The "value" represents the user information received from the provider terminal 10. The "providing count" represents the number of times of providing of the user information from the information transaction apparatus 100 to the user terminal 20 in the past.

For example, FIG. 4 illustrates an example where a provider terminal 10 corresponding to a provider identifier "U01" acquires position information "A01", atmospheric pressure information "B01", sound collection information "C01", illuminance information "D01", and gradient information "E01" at "12:00:00, Nov. 1, 2013". In addition, FIG. 4 illustrates an example where the providing count of the position information "A01" is "3", the providing count of the atmospheric pressure information "B01" is "1", the providing count of the sound collection information "C01" is "3", the providing count of the illuminance information "D01" is "1", and the providing count of the gradient information "E01" is "1".

In addition, for example, FIG. 4 illustrates an example where a provider terminal 10 corresponding to a provider identifier "U02" acquires position information "A02" and sound collection information "C02" at "12:00:00, Nov. 1, 2013".

Similarly to the above-described two examples, depending on the provider terminal 10, in some cases, all the types of the user information (in the above-described examples, the "position information", the "atmospheric pressure information", the "sound collection information", the "illuminance information", and the "gradient information") may be transmitted to the information transaction apparatus 100, and in other cases, only a portion of the types of the user information may be transmitted to the information transaction apparatus 100.

In addition, although FIG. 4 illustrates the example where conceptual information such as "A01" is stored in the "value" of the "position information", in actual cases, "latitude and longitude", "address (for example, To-Do-Fu-Ken or Shi-Ku-Machimura)", or the like is stored. In addition, in actual cases, a numeric value indicating an atmospheric pressure is stored in the "atmospheric pressure information" illustrated in FIG. 4, a numeric value indicating an intensity of sound is stored in the "sound collection information", a numeric value indicating illuminance is stored in the "illuminance information", and a numeric value indicating a gradient is stored in the "gradient information".

Returning to the description of FIG. 3, the control unit 130 is embodied, for example, by a CPU, an MPU, or the like executing various programs (corresponding to an example of an information transaction program) stored in the memory device inside the information transaction apparatus 100 in the RAM as a work area. In addition, the control unit 130 is embodied, for example, by using an integrated circuit such as an ASIC or an FPGA.

As illustrated in FIG. 3, the control unit 130 is configured to include a receiving unit 131, a storage unit 132, and a transaction unit 140 to implement or execute functions or operations of the information process described hereinafter. In addition, the internal configuration of the control unit 130 is not limited to the configuration illustrated in FIG. 3, but any other configurations which perform the information process described hereinafter may be used. In addition, a connection relation between processing units included in the control unit 130 is not limited to the connection relation illustrated in FIG. 3, but other connection relations may be used.

The receiving unit 131 receives the user information on the provider terminal 10 or the information provider from the provider terminal 10. For example, the receiving unit 131 receives the provider identifier, the user information, and the acquisition date and time of the user information from the provider terminal 10.

The storage unit 132 stores the user information received by the receiving unit 131 in the user information memory unit 121. More specifically, the storage unit 132 stores the user information in the user information memory unit 121 in correspondence with the provider identifier and the acquisition date and time received by the receiving unit 131. For example, in a case where the position information and the atmospheric pressure information are received as the user information, the storage unit 132 stores the position information and the atmospheric pressure information in the user information memory unit 121.

In addition, although the above-described example illustrates an example where the provider terminal 10 transmits the acquisition date and time of the user information to the information transaction apparatus 100, the present invention is limited to the example, but the provider terminal 10 may not transmit the acquisition date and time to the information transaction apparatus 100. In this case, the storage unit 132 stores a reception date and time where the user information is received by the receiving unit 131 in the acquisition date and time of the user information memory unit 121.

The transaction unit 140 controls transaction of the user information between the provider terminal 10 and the user terminal 20. More specifically, in a case where the transaction unit 140 accepts the acquisition request for the user information from the user terminal 20, the transaction unit 140 controls a transaction process of providing the user information corresponding to the acquisition request to the user terminal 20 and paying a reward to the information provider which is a transmission source of the provided user information based on factor information which affects the value of the user information stored in the user information memory unit 121. As illustrated in FIG. 3, the transaction unit 140 is configured to include a request accepting unit 141, a calculating unit 142, and a providing unit 143.

The request accepting unit 141 accepts the acquisition request for the user information from the user terminal 20. More specifically, the request accepting unit 141 accepts the acquisition request including specifying information for specifying the user information as an acquisition object. For example, the request accepting unit 141 accepts the acquisition request including specifying information for specifying a type of the user information. In addition, for example, the request accepting unit 141 accepts the acquisition request including specifying information for specifying a duration of the acquisition date and time when the user information is acquired. In addition, for example, the request accepting unit 141 accepts the acquisition request including specifying information for specifying both of the type of the user information and the duration of the acquisition date and time. As described in an example, the request accepting unit 141 accepts the acquisition request including the specifying information where the types of the user information are the "position information" and the "atmospheric pressure information" and the acquisition date and time is "November 1 through Nov. 15, 2013".

The calculating unit 142 calculates the price of the user information provided to the user terminal 20 based on the factor information corresponding to the respective pieces of the user information stored in the user information memory unit 121. More specifically, the calculating unit 142 dynamically evaluates the factor information at the time when the acquisition request is accepted and calculates the price of the user information based on the evaluated factor information. The calculating unit 142 according to the first embodiment evaluates market situations of the respective pieces of the user information stored in the user information memory unit 121 as the factor information. More specifically, the calculating unit 142 evaluates the market situations of the respective pieces of the user information at the current time by using the providing counts of the respective pieces of the user information stored in the user information memory unit 121. Next, the calculating unit 142 calculates the prices of the pieces of the user information based on the number of pieces of the user information corresponding to the acquisition request and the market situation which is an evaluation result.

As described more in detail, the calculating unit 142 calculates the price of the user information to be higher as the number of pieces of the user information corresponding to the acquisition request becomes larger and calculates the price of the user information to be lower as the number of pieces of the user information corresponding to the acquisition request becomes smaller. In addition, the calculating unit 142 evaluates a degree of demand and a degree of supply (in other words, needs or popularity) with respect to the user information corresponding to the acquisition request as the market situation based on the "providing count" stored in the user information memory unit 121. More specifically, the calculating unit 142 acquires the "providing count" of the user information corresponding to the acquisition request accepted by the request accepting unit 141 from the user information memory unit 121, evaluates the needs (a degree of demand and a degree of supply) of the user information to be higher as the acquired "providing count" has a larger value and evaluates the needs of the user information to be lower as the acquired "providing count" has a smaller value. In addition, the calculating unit 142 calculates the price of the user information to be higher as a larger number of pieces of the user information of which needs are high are included in the user information corresponding to the acquisition request and calculates the price of the user information to be lower as a larger number of pieces of the user information of which needs are low are included in the user information corresponding to the acquisition request.

As described in an example, it is assumed that user information corresponding to the acquisition request which is to be accepted by the request accepting unit 141 is set to be position information "A11", "A12", "A13", "A14", and "A15". In addition, it is assumed that the providing count corresponding to the position information "A11" is set to "3", the providing count corresponding to the position information "A12" is set to "3", the providing count corresponding to the position information "A13" is set to "2", the providing count corresponding to the position information "A14" is set to "1", and the providing count corresponding to the position information "A15" is set to "1". In addition, it is assumed that a reference unit price which is a price per one piece of the position information is set to "Y yen". In addition, the reference unit price may be a different value according to the type of the user information.

In this case, the calculating unit 142 calculates an average value of the providing counts corresponding to all the pieces of the position information by referring to the user information memory unit 121. Herein, it is assumed that the calculating unit 142 calculates "2" as an average value of the providing counts corresponding to the position information. Next, the calculating unit 142 corrects the reference unit price "Y yen" of the position information "A11", "A12", "A13", "A14", and "A15" corresponding to the acquisition request based on the average value "2" of the providing counts. In the above-described example, the providing count "3" of the position information "A11" is 1.5 times the average value "2" of the providing counts. In this case, the calculating unit 142 corrects, for example, the reference unit price of the position information "A11" to be "1.5Y yen". Similarly, the calculating unit 142 corrects, for example, the reference unit price of the position information "A12" to be "1.5Y yen". In addition, the calculating unit 142 defines the reference unit price as "Y yen" without correction, for example, with respect to the position information "A13", "A14", and "A15" of which providing counts are not larger than the average value "2" of the providing counts. Next, the calculating unit 142 calculates a total price of the position information "A11", "A12", "A13", "A14", and "A15" corresponding to the acquisition request to be "6.0Y yen" by adding the respective corrected reference unit prices "1.5Y yen", "1.5Y yen", "Y yen", "Y yen", and "Y yen".

In addition, in the above-described example, the calculating unit 142 may correct the reference unit prices of the position information "A14" and "A15" which are smaller than the average value "2" of the providing counts to be low prices. For example, the providing count "1" of the position information "A14" is 0.5 times the average value "2" of the providing counts. In this case, the calculating unit 142 corrects, for example, the reference unit price of the position information "A14" to be "0.5Y yen". Similarly, the calculating unit 142 corrects, for example, the reference unit price of the position information "A15" to be "0.5Y yen". In this case, the calculating unit 142 calculates a total price of the position information corresponding to the acquisition request to be "5.0Y yen" by adding the respective corrected reference unit prices "1.5Y yen", "1.5Y yen", "Y yen", "0.5Y yen", and "0.5Y yen".

In addition, the calculation process of the above-described calculating unit 142 is an example, and the present invention is not limited to the above-described example. For example, the calculating unit 142 may acquire the providing counts of the user information corresponding to the acquisition request from the user information memory unit 121 and may calculate a total price of the user information provided to the user terminal 20 based on a total sum or an average value of the acquired providing counts. As an example, the calculating unit 142 calculates the total price of the user information to be higher as the average providing count of the user information corresponding to the acquisition request becomes larger than the average providing count of all the pieces of the position information stored in the user information memory unit 121.

In addition, the calculating unit 142 calculates the amounts of rewards which are to be paid to the information providers which are transmission sources of the user information provided to the user terminal 20. More specifically, the calculating unit 142 calculates the amounts of rewards by which the usage fee gained from the information user is to be shared among the information providers according to the above-described factor information (market situations evaluated based on the providing counts).

As described in an example, similarly to the above-described example, it is assumed that user information corresponding to the acquisition request accepted by the request accepting unit 141 is the position information "A11", "A12", "A13", "A14", and "A15". In addition, it is assumed that the position information "A11" is the user information corresponding to the information provider P1, the position information "A12" is the user information corresponding to the information provider P2, the position information "A13" is the user information corresponding to the information provider P3, the position information "A14" is the user information corresponding to the information provider P4, and the position information "A15" is the user information corresponding to the information provider P5. In addition, herein, it is assumed that the reference unit prices of the position information "A11", "A12", "A13", "A14", and "A15" are corrected to be "1.5Y yen", "1.5Y yen", "Y yen", "0.5Y yen", and "0.5Y yen", respectively, by the calculating unit 142. Namely, in this example, the usage fee "5.0Y yen" is paid by the information user.

Herein, it is assumed that the manager or the like of the information transaction apparatus 100 allows the amount obtained by deducting a commission from the usage fee "5.0Y yen" gained from the information user in the above-described example to be shared among the information providers P1 to P5. In this example, it is assumed that 20% of the usage fee "5.0Y yen", that is, "1.0Y yen" is the commission. Namely, the calculating unit 142 allows "4.0Y yen" to be shared among the information providers P1 to P5. In the case of this example, a ratio of contribution of the information providers P1 to P5 with respect to the usage fee "5.0Y yen" is "1.5:1.5:1.0:0.5:0.5". Therefore, the calculating unit 142 calculates the amount of reward for the information provider P1 to be "4.0Y·{1.5/(1.5+1.5+1.0+0.5+0.5)}"="1.2Y yen" based on the ratio of contribution. Similarly, the calculating unit 142 calculates the amount of reward for the information provider P2 to be "1.2Y yen", calculates the amount of reward for the information provider P3 to be "0.8Y yen", calculates the amount of reward for the information provider P4 to be "0.4Y yen", and calculates the amount of reward for the information provider P5 to be "0.4Y yen".

In addition, the above-described calculation process of the calculating unit 142 is an example, and the present invention is not limited to the above-described example. For example, by acquiring the providing counts of the pieces of the user information corresponding to the acquisition request from the user information memory unit 121, the calculating unit 142 may calculate the amount of reward for the information provider which provides the user information at a larger providing count to be higher and may calculate the amount of reward for the information provider-which provides the user information at a smaller providing count to be lower The providing unit 143 provides the user information corresponding to the acquisition request to the user terminal 20 which is a transmission source of the acquisition request accepted by the request accepting unit 141. More specifically, the providing unit 143 notifies the price of the user information calculated by the calculating unit 142 to the user terminal 20 and provides the user information corresponding to the acquisition request to the user terminal 20. Next, the providing unit 143 adds "1" to the providing count of the user information provided to the user terminal 20 among the providing counts corresponding to the respective pieces of the user information stored in the user information memory unit 121.

In addition, after notifying the price of the user information calculated by the calculating unit 142 to the user terminal 20, in the case of receiving the notice indicating approval of payment of the price from the user terminal 20, the providing unit 143 may provide the user information corresponding to the acquisition request to the user terminal 20. In addition, besides the user information, the providing unit 143 may provide a combination of the user information and the provider identifier to the user terminal 20. In this case, instead of the provider identifier stored in the user information memory unit 121, the providing unit 143 may convert the provider identifier into another information and provide the converted provider identifier to the user terminal 20.

In addition, the providing unit 143 notifies the amount of reward for the providing of the user information to the provider terminal 10 which is a transmission source of the user information provided to the user terminal 20. More specifically, the providing unit 143 notifies the amounts of rewards for the respective information providers calculated by the calculating unit 142 to the respective provider terminals 10.

4. Procedure of Information Storing Process

Figure 5:
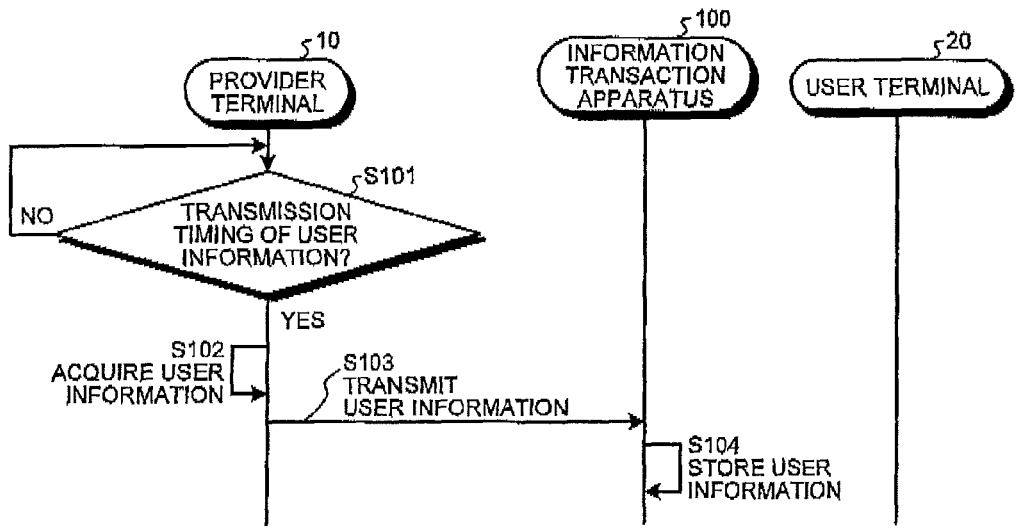
FIG. 5 is a sequence diagram illustrating a procedure of an information storing process of an information distribution system according to the first embodiment.

Next, a procedure of an information storing process of the information distribution system 1 according to the first embodiment will be described with reference to FIG. 5. FIG. 5 is a sequence diagram illustrating the procedure of the information storing process of the information distribution system 1 according to the first embodiment.

As illustrated in FIG. 5, the provider terminal 10 determines whether or not the current time is a transmission timing of the user information (step S101). Next, in a case where the current time is not the transmission timing (No in step S101), the provider terminal 10 waits until the current time is the transmission timing.

On the other hand, in a case where the current time is the transmission timing (Yes in step S101), the provider terminal 10 acquires various types of the user information (for example, the position information, the atmospheric pressure information, the sound collection information, the illuminance information, the gradient information, and the like) by controlling the sensing unit 14 (step S102).

Subsequently, the provider terminal 10 transmits the user information to the information transaction apparatus 100 (step S103). For example, the provider terminal 10 transmits the provider identifier, the user information, and the acquisition date and time of the user information to the information transaction apparatus 100.

Next, the information transaction apparatus 100 stores the user information received from the provider terminal 10 in the user information memory unit 121 (step S104). For example, the information transaction apparatus 100 stores the user information in the user information memory unit 121 in correspondence with the provider identifier and the acquisition date and time.

5. Procedure of Information Providing Process

Figure 6:
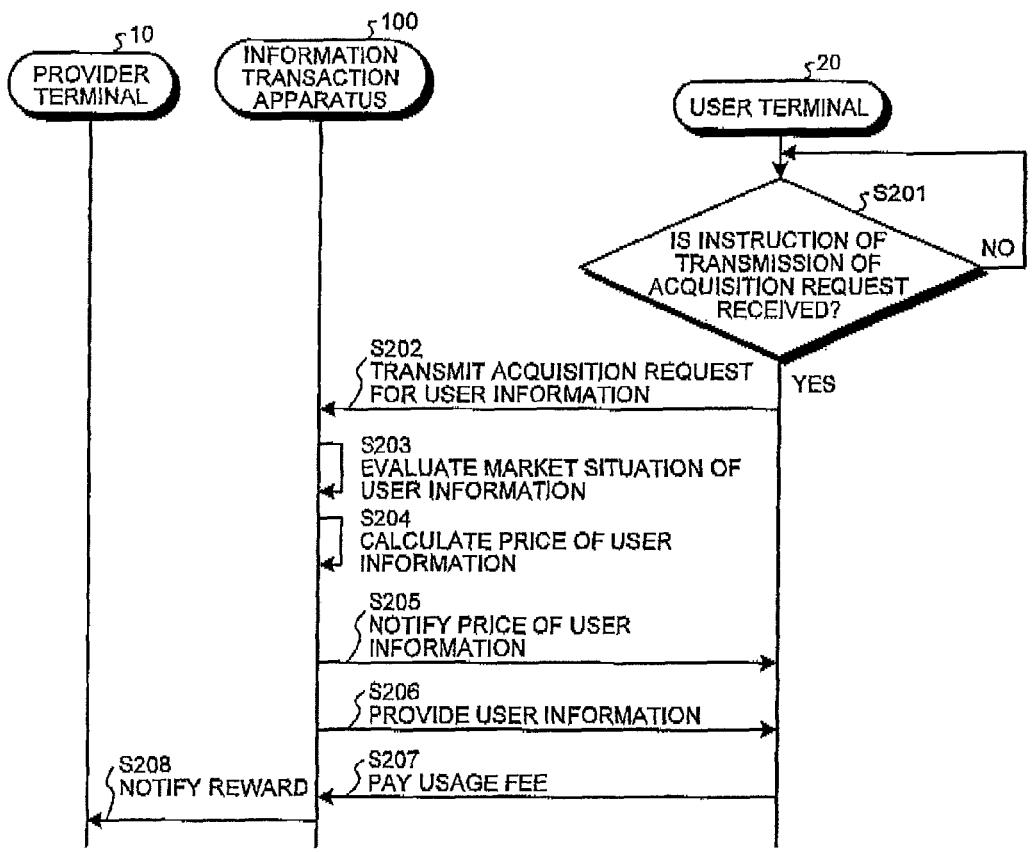
FIG. 6 is a sequence diagram illustrating a procedure of an information providing process of the information distribution system according to the first embodiment.

Next, a procedure of the information providing process of the information distribution system 1 according to the first embodiment will be described with reference to FIG. 6. FIG. 6 is a sequence diagram illustrating the procedure of the information providing process of the information distribution system 1 according to the first embodiment.

As illustrated in FIG. 6, the user terminal 20 determines whether or not an operation indicating transmission of the acquisition request for the user information is received (step S201). Next, in a case where the operation indicating transmission of the acquisition request is not received (No in step S201), the user terminal 20 waits until the operation is received.

On the other hand, in a case where the operation indicating transmission of the acquisition request is received (Yes in step 3201), the user terminal 20 transmits the acquisition request for, the user information to the information transaction apparatus 100 (step S202).

Subsequently, the information transaction apparatus 100 evaluates the market situation of the user information requested according to the acquisition request based on the providing count stored in the user information memory unit 121 (step S203). Subsequently, the information transaction apparatus 100 calculates the price of the user information requested according to the acquisition request based on a result of the evaluation of the market situation (step S204).

Subsequently, the information transaction apparatus 100 notifies the price of the user information to the user terminal 20 (step S205) and provides the user information to the user terminal 20 (step S206).

Next, the information user of the user terminal 20 pays, as a usage fee, the price notified in step S205 to the manager or the like of the information transaction apparatus 100 (step S207). In addition, the information transaction apparatus 100 notifies a portion or all of the usage fee gained from the information user to the information provider of the provider terminal 10 (step S208).

6. Effect

As described above, information transaction apparatus 100 according to the first embodiment is configured to include the receiving unit 131, the storage unit 132, and the transaction unit 140. The receiving unit 131 receives the user information on the information provider or the provider terminal 10 from the provider terminal 10 used by the information provider. The storage unit 132 stores the user information received by the receiving unit 131 in the user information memory unit 121. In a case where the transaction unit 140 accepts the acquisition request for the user information from the user terminal 20 used by information user, the transaction unit 140 controls a transaction process of providing the user information corresponding to the acquisition request to the user terminal 20 based on the factor information which affects the value of the user information stored in the user information memory unit 121 and paying a reward to the information provider which is a transmission source of the provided user information.

Accordingly, since the information transaction apparatus 100 according to the first embodiment is capable of calculating the price appropriate for the value of the user information, it is possible to provide the user information appropriate for the price to the information user, and it is possible to provide the reward appropriate for the value of the user information to the information provider. As a result, it is possible for the information transaction apparatus 100 according to the first embodiment to allow the information provider and the information user to gain appropriate profits.

In addition, the transaction unit 140 according to the first embodiment is configured to include the calculating unit 142 which evaluates market situation of the user information stored in the user information memory unit 121 as factor information and calculates the price of the user information provided to the user terminal 20 based on the evaluated market situation.

Accordingly, since it is possible for the information transaction apparatus 100 according to the first embodiment to calculate the appropriate price of the user information based on the market situation of the user information, it is possible for the information transaction apparatus 100 to allow both of the information provider and the information user to gain more appropriate profits.

In addition, the transaction unit 140 according to the first embodiment is configured to include the providing unit 143 which provides the user information corresponding to the acquisition request to the user terminal 20 in the case of receiving the notice indicating approval of payment of the price calculated by the calculating unit 142 from the user terminal 20.

Accordingly, it is possible for the information transaction apparatus 100 according to the first embodiment to provide a reliable user information transaction service to the information user.

In addition, the calculating unit 142 according to the first embodiment dynamically evaluates the factor information at the time when the acquisition request is accepted and calculates the price of the user information provided to the user terminal 20 based on the evaluated factor information.

Accordingly, since the information transaction apparatus 100 according to the first embodiment is capable of calculating an appropriate price of the user information at a high accuracy based on the latest factor information, it is possible for the information transaction apparatus 100 to allow both of the information provider and the information user to gain more appropriate profits.

7. Modified Example

In the first embodiment described above, the example where the providing count of the user information actually provided to the user terminal 20 is stored in the user information memory unit 121 is illustrated. Therefore, in the first embodiment described above, the example where the calculating unit 142 calculates the price of the user information based on the providing count stored in the user information memory unit 121 is illustrated. However, the user information memory unit 121 may store a requesting count of the user information requested from the user terminal 20 irrespective, of whether the user information is actually provided to the user terminal 20 for each piece of the user information. More specifically, even in a case where the user terminal 20 transmits the acquisition request to the information transaction apparatus 100, the user terminal 20 may not acquire the user information from the information transaction apparatus 100 depending on the price of the user information. However, it may be said that the needs (namely, a degree of demand) of the user information which is an object of the acquisition request are high. Therefore, instead of the above-described providing count, the calculating unit 142 may calculate the price of the user information by using the requesting count stored in the user information memory unit 121. In addition, the user information memory unit 121 may store both of the providing count and the requesting count. In this case, the calculating unit 142 may calculate the price of the user information by using both of the providing count and the requesting count stored in the user information memory unit 121.

In addition, in the first embodiment described above, the example where the calculating unit 142 calculates the price to be higher as the providing count of the user information stored in the user information memory unit 121 becomes larger is illustrated. However, the calculating unit 142 may calculate the price to be higher as the providing count of the user information becomes smaller. This is because it may be said that the user information of which providing count for the user terminal 20 is small is also the information which is not widely known and, thus, the user information is likely to be profitable for the information user. For the same reason, in a case where the above-described requesting count is stored in the user information memory unit 121, the calculating unit 142 may calculate the price to be higher as the requesting count of the user information becomes smaller.

In addition, although FIG. 4 illustrates the example where the user information memory unit 121 stores the providing count of each one piece of the user information, the present invention is not limited to the example. For example, depending on the information transaction apparatus 100, in some cases, it may be determined that the user information (for example, user information where the acquisition date and time is November in 2013 or user information where the acquisition date and time is October through December in 2013) is provided to the user terminal 20 in units of one month. In this case, the user information memory unit 121 may store the providing count every month.

Second Embodiment

In the first embodiment described above, the example where the market situation of the user information is used as the factor information which affects the value of the user information is illustrated. However, the factor information which affects the value of the user information may also be feature information representing features of the user information such as accuracy, granularity, and rarity of the user information. In the second embodiment, an example where the price of the user information is calculated by using the feature information of the user information as the factor information will be described. In addition, a configuration of the information distribution system 1 according to the second embodiment is the same as that of the example illustrated in FIG. 1, and thus, the description thereof is omitted hereinafter.

1. Configuration of Information Transaction Apparatus

Figure 7:
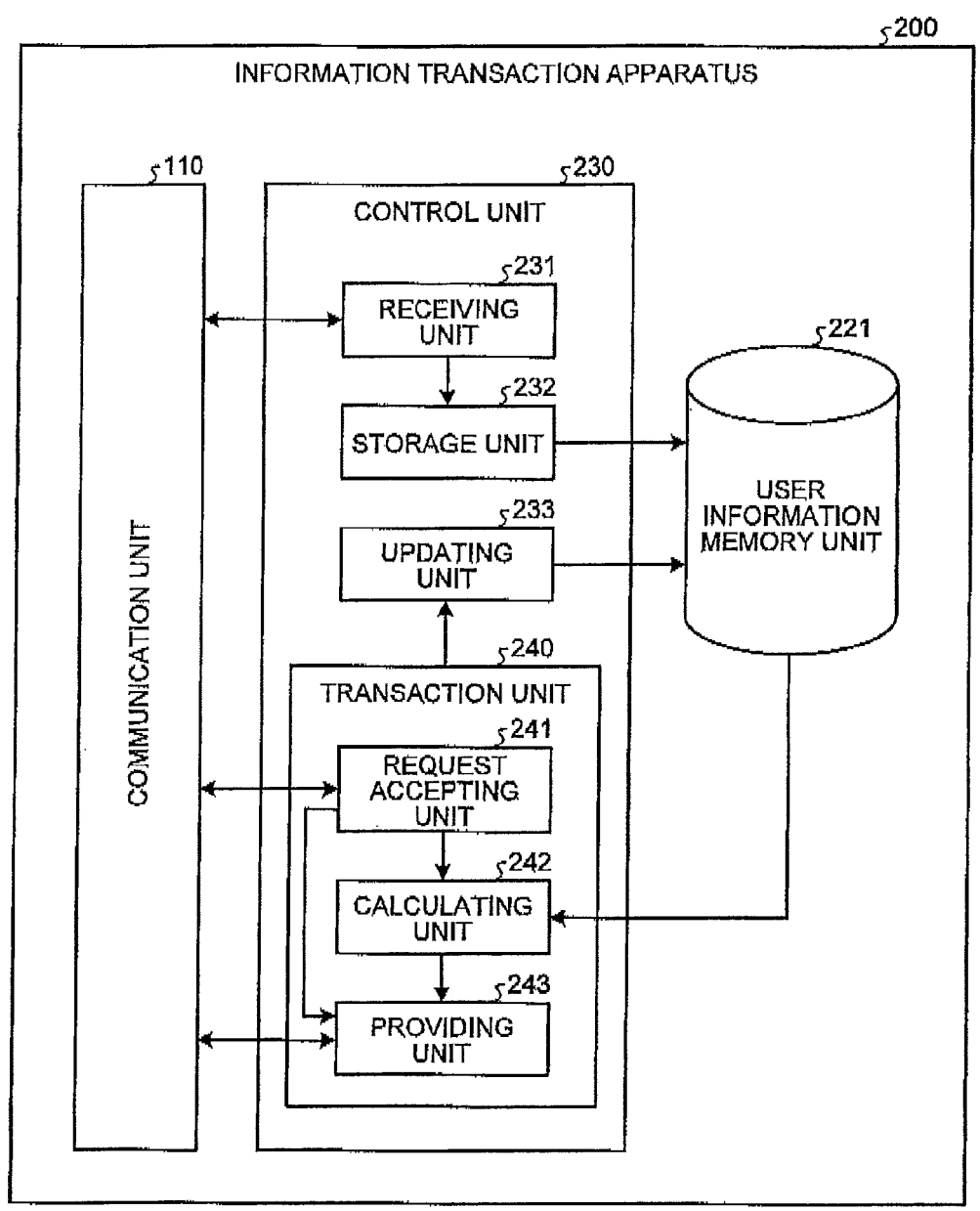
FIG. 7 is a diagram illustrating a configuration example of an information transaction apparatus according to a second embodiment.

First, the configuration of the information transaction apparatus 200 according to the second embodiment will be described with reference to FIG. 7. FIG. 7 is a diagram illustrating a configuration example of the information transaction apparatus 200 according to the second embodiment. As illustrated in FIG. 7, the information transaction apparatus 200 is configured to include a user information memory unit 221 and a control unit 230.

The user information memory unit 221 stores user information provided from a provider terminal 10. Herein, an example of the user information memory unit 221 according to the second embodiment is illustrated in FIG. 8. In the example illustrated in FIG. 8, the user information memory unit 221 has items of "acquisition date and time", "provider identifier", and "user information".

The "acquisition date and time" corresponds to the acquisition date and time illustrated in FIG. 4. The "provider identifier" corresponds to the provider identifier illustrated in FIG. 4. Similarly to the example of FIG. 4, the "user information" may be divided into the types of the "position information" and the "atmospheric pressure information". In addition, although the illustration is omitted in FIG. 8, the "user information" may have types of "sound collection information", "illuminance information", "gradient information", and the like.

In addition, the user information illustrated in FIG. 8 may be divided into items of "value", "accuracy", "granularity", and "rarity" for each type. Similarly to the value illustrated in FIG. 4, the "value" represents the user information received from the provider terminal 10. The "accuracy", the "granularity", and the "rarity" correspond to feature information representing features of the user information and, namely, correspond to factor information which affects the value of the user information. More specifically, the "accuracy" represents an accuracy of the user information. The "granularity" represents fineness or a degree of detail of the user information. The "rarity" represents a rarity value of the user information in comparison with other pieces of the user information in the same type of the user information.

In addition, evaluation values indicating 5 levels of "1" to "5" are stored in the "accuracy", the "granularity", and the "rarity" illustrated in FIG. 8. In the example herein, the evaluation value "1" represents the lowest value, and the evaluation value "5" represents the highest value.

For example, the user information where a large value is stored in the "accuracy" indicates that the user information is acquired at a high accuracy by a sensing unit 14 of the provider terminal 10. For example, depending on the sensing unit 14 of the provider terminal 10, in some cases, an accuracy of the acquisition process of the user information may be calculated. The information transaction apparatus 200 according to the second embodiment receives the accuracy of the acquisition process from the provider terminal 10 and updates the accuracy of user information memory unit 221 according to the received accuracy.

In addition, for example, the user information where a large value is stored in the "granularity" indicates that the user information itself is detailed. As the position information is described as an example, depending on the provider terminal 10, in some cases, a latitude and a longitude capable of specifying the position in detail as the position information may be transmitted to the information transaction apparatus 200. In addition, depending on the provider terminal 10, in some cases, only the "To-Do-Fu-Ken" as the position information may be transmitted to the information transaction apparatus 200. In addition, depending on the provider terminal 10, in some cases, the "To-Do-Fu-Ken" and the "Shi-Ku-Machimura" as the position information may be transmitted to the information transaction apparatus 200. The information transaction apparatus 200 according to the second embodiment updates the granularity of the user information memory unit 221 according to the granularity of the user information itself.

In addition, for example, the user information where a large value is stored in the "rarity" indicates that the user information is greatly different from other pieces of user information. As the position information is described as an example, it is assumed that, among the plural pieces of the position information which the information transaction apparatus 200 receives from the respective provider terminals 10, the number of pieces of the position information indicating "inside Tokyo To" is largest, and the number of pieces of the position information indicating "inside Gifu Ken" is smallest. In this case, since a large number of pieces of the position information indicating "inside Tokyo To" are retained in the information transaction apparatus 200, the rarity is low. Therefore, a low evaluation value (for example, "1" or the like) is stored in the "rarity" of the user information memory unit 221. On the other hand, since a small number of pieces of the position information indicating "inside Gifu Ken" are retained in the information transaction apparatus 200, the rarity is high. Therefore, a high evaluation value (for example, "5" or the like) is stored in the "rarity" of the user information memory unit 221.

Returning to the description of FIG. 7, the control unit 230 is configured to include a receiving unit 231, a storage unit 232, an updating unit 233, and a transaction unit 240 to implement or execute functions or operations of the information process described hereinafter. In addition, the internal configuration of the control unit 230 is not limited to the configuration illustrated in FIG. 7, but any other configurations which perform the information process described hereinafter may be used. In addition, a connection relation between processing units included in the control unit 230 is not limited to the connection relation illustrated in FIG. 7, but other connection relations may be used.

Similarly to the receiving unit 131 according to the first embodiment, the receiving unit 231 receives a provider identifier, user information, and an acquisition date and time of the user information from the provider terminal 10. In addition, as described above, depending on the sensing unit 14 of the provider terminal 10, in some cases, the accuracy of the acquisition process of the user information may be calculated. The receiving unit 231 according to the second embodiment may receive the accuracy of the acquisition process of the user information together with the user information from the provider terminal 10.

The storage unit 232 stores the user information received by the receiving unit 231 in the user information memory unit 221. Herein, in a case where the accuracy of the user information is received by the receiving unit 231, the storage unit 232 according to the second embodiment stores the evaluation value (in the above-described example, any one of "1" to "5") in the accuracy of the user information memory unit 221 based on the received accuracy. In addition, the storage unit 232 determines the granularity of the user information received by the receiving unit 231 and stores the evaluation value in the granularity of the user information memory unit 221 based on a result of the determination.

For example, the storage unit 232 retains threshold values and the like for determining the evaluation values of the respective pieces of the factor information for each type of the user information. Next, the storage unit 232 determines the evaluation values of the respective pieces of the user information by comparing the user information received from the receiving unit 231 with the threshold values and the like. As the position information is described as an example, the storage unit 232, for example, retains the ranges of the threshold values corresponding to the respective evaluation values of the accuracy. In addition, for example, the storage unit 232 retains the information that is the evaluation value "5" of the granularity in a case where the position information is a longitude and a latitude, and the storage unit 232 retains the information that is the evaluation value "1" of the granularity in a case where the position information is only "To-Do-Fu-Ken". The storage unit 232 specifies the evaluation values of the respective pieces of the factor information based on the threshold values corresponding to the respective evaluation values.

The updating unit 233 updates the factor information stored in the user information memory unit 221. More specifically, the updating unit 233 periodically (for example, everyday) updates the factor information which is likely to be dynamically changed among the factor information stored in the user information memory unit 221. As described by using the example of FIG. 8, among the factor information "accuracy", "granularity", and "rarity" stored in the user information memory unit 221, the "rarity" which is determined through comparison with other pieces of the user information is likely to be changed when new user information is stored in the user information memory unit 221. Therefore, in the case of the example of FIG. 8, the updating unit 233 periodically updates the "rarity" of the user information memory unit 221.

As the position information is described as an example, the updating unit 233 counts the number of pieces of the position information of, for example, each "To-Do-Fu-Ken" by referring to the position information stored in the item "value" of the user information memory unit 221. Next, the updating unit 233 updates the rarity corresponding to the position information of which count result is smallest to the evaluation value "5" and updates the rarity corresponding to the position information of which count result is largest to the evaluation value "1". In addition, the present invention is not limited to the example, but the updating unit 233 calculates an average value of the count result and updates the rarity to have a higher evaluation value as the difference between the calculated average value and the count result of the position information becomes larger. In addition, the updating unit 233 may update the evaluation value of the rarity by using an outlier value detection method for, for example, a local outlier factor (LOF) and the like. In the case of the example, the updating unit 233 updates the rarity to have a higher evaluation value as the value of the LOF of the position information becomes larger.

In addition, the present invention is not limited to the rarity, but the updating unit 233 may periodically update the "accuracy" or "granularity stored in the user information memory unit 221. For example, the above-described storage unit 232 stores the accuracy of the user information received by the receiving unit 231 in the memory unit not illustrated in FIG. 7. Next, the updating unit 233 calculates the average value of the accuracy for each type of the user information by periodically referring to the memory unit and updates the accuracy to a high evaluation value as the accuracy of the user information is higher than the average value. Similarly, the updating unit 233 may also periodically update the evaluation value of the granularity.

As illustrated in FIG. 7, the transaction unit 240 is configured to include a request accepting unit 241, a calculating unit 242, and a providing unit 243. Similarly to the request accepting unit 141 according to the first embodiment, the request accepting unit 241 accepts an acquisition request for the user information from the user terminal 20. Herein, the request accepting unit 241 according to the second embodiment may accept the evaluation value of the factor information as the specifying information for specifying the user information which is an acquisition object.

For example, the request accepting unit 241 accepts an acquisition request including the specifying information where the type of the user information is "position information", the factor information "accuracy" is "3" or more, and the acquisition date and time is "November 1 through Nov. 15, 2013".

The calculating unit 242 calculates the price of the user information based on the factor information of the user information corresponding to the acquisition request which is accepted by the request accepting unit 241. More specifically, the calculating unit 242 calculates the price of the user information based on the factor information "accuracy", "granularity", and "rarity" stored in the user information memory unit 221.

As described more in detail, the calculating unit 242 acquires the evaluation value indicated by the factor information (accuracy, granularity, and rarity) of the user information corresponding to the acquisition request from the user information memory unit 221. Next, the calculating unit 242 calculates the price of the user information corresponding to the acquisition request to be higher as a larger number of pieces of the user information of which evaluation value is high are included in the user information corresponding to the acquisition request. On the other hand, the calculating unit 242 calculates the price of the user information corresponding to the acquisition request to be lower as a larger number of pieces of the user information of which evaluation value is low are included in the user information corresponding to the acquisition request.

As described in an example, it is assumed that the user information which is requested according to the acquisition request is the position information. In this case, the calculating unit 242 acquires the evaluation values of the accuracy corresponding to all the pieces of the position information from the user information memory unit 221 and calculates the average value of the acquired evaluation values. Next, the calculating unit 242 calculates the price of the user information to be higher as the evaluation value of the accuracy of the user information required according to the acquisition request becomes higher than the average value of the evaluation values. On the other hand, the calculating unit 242 calculates the price of the user information to be lower as the evaluation value of the accuracy of the user information required according to the acquisition request becomes lower than the average value of the evaluation values. Similarly, the calculating unit 242 calculates the price of the user information requested according to the acquisition request by using the evaluation value of the granularity or the rarity.

In addition, in a case where the reference unit price which is a price per piece of the user information is determined, similarly to the example described in the first embodiment, the calculating unit 242 may calculate the prices of the respective pieces of the user information by correcting the reference unit price according to the difference between the average value of the evaluation values and the evaluation values of the respective pieces of the user information. In addition, the present invention is not limited to the above-described example, but the calculating unit 242 may calculate the prices of the respective pieces of the user information by multiplying coefficients, which are determined for the respective evaluation values in advance, with the reference unit price.

In addition, similarly to the calculating unit 142 according to the first embodiment, the calculating unit 242 calculates the amounts of rewards which are to be paid to the information providers, which are transmission sources of the user information provided to the user terminal 20, according to the above-described factor information. More specifically, the calculating unit 242 calculates the amounts of rewards which are to be shared among the information providers according to degrees of contribution of the respective information providers with respect to the usage fee which is to be charged to the information user.

The providing unit 243 provides the user information corresponding to the acquisition request to the user terminal 20 which is a transmission source of the acquisition request accepted by the request accepting unit 241. In addition, besides the user information, the providing unit 243 may provide a combination of the user information and the provider identifier to the user terminal 20.

In addition, in a case where the acquisition request is accepted by the request accepting unit 241, the above-described transaction unit 240 may instruct the updating unit 233 to update the user information memory unit 221. Accordingly, the transaction unit 240 can update the factor information stored in the user information memory unit 221 to the latest state at the current time.

2. Effect

As described above, the information transaction apparatus 200 according to the second embodiment calculates the price of the user information by using at least one or more among the accuracy representing the accuracy of the user information stored in the user information memory unit 221, the granularity representing the degree of detail of the user information, and the rarity representing the rarity value of the user information as the factor information.

Accordingly, since the information transaction apparatus 200 according to the second embodiment may calculate the price appropriate for the value of the user information, it is possible to provide the user information appropriate for the price to the information user, and it is possible to provide the reward appropriate for the value of the user information to the information provider. As a result, it is possible for the information transaction apparatus 200 according to the second embodiment to allow both of the information provider and the information user to gain appropriate profits.

3. Modified Example

In the above-described second embodiment, the "accuracy", the "granularity", and the "rarity" are described as examples of the factor information. However, the present invention is not limited to the examples, the factor information may be "freshness" which is based on the acquisition date and time of the user information, "collection period" which is based on the period during which the user information is collected, "distribution of the acquisition date and time" in the collection period, or the like. More specifically, the "freshness" represents the freshness of the user information. For example, as the acquisition date and time of the user information is closer to the current date and time, the evaluation value of the "freshness" is set to be higher. In addition, the "collection period" represents the period during which the same type of the user information is periodically or continuously acquired by the same user terminal 20. For example, as the period during which the user information is periodically acquired by the same user terminal 20 becomes longer, the evaluation value of the "collection period" is set to be higher. In addition, for example, as the time interval of the acquisition date and time of the user information acquired by the same user terminal 20 becomes shorter, the evaluation value of the "collection period" is set to be higher.

In this case, the calculating unit 242 calculates the price of the user information to be higher as the evaluation value of the "freshness" becomes higher (namely, as the user information becomes newer). This is because the newer user information is more highly likely to be information profitable for the information user. Alternatively, the calculating unit 242 may calculate the price of the user information to be lower as the evaluation value of the "freshness" becomes higher (namely, as the user information becomes newer). This is because the older user information is more highly likely to be hard to acquire and the older user information is likely to be more profitable for the information user. In addition, the calculating unit 242 calculates the price of the user information to be higher as the evaluation value of the "collection period" becomes higher. This is because the user information group which is acquired at a high density for a long time is high likely to be profitable for the information user.

In addition, in the above-described second embodiment, the calculating unit 242 may calculate the price of the user information based on a combination of the types of the user information requested according to the acquisition request. For example, depending on the user terminal 20, in some cases, only the position information may be requested; in some cases, all of the position information, the atmospheric pressure information, the sound collection information, the illuminance information, and the gradient information may be requested; and in some cases, in addition to the user information such as the position information, the provider identifier may be requested. Herein, for example, the calculating unit 242 may calculate the price of the user information to be relatively higher as the number of types of the user information which is an acquisition object becomes larger. In addition, the calculating unit 242 may calculate the price of the user information to be relatively higher as the types of which needs are higher are combined.

Third Embodiment

In the first and second embodiments described above, the examples where the market situation or the feature information of the user information is used as the factor information which affects the value of the user information are illustrated. However, the factor information which affects the value of the user information may be a transaction situation representing a situation where the user information is transacted with respect to the provider terminal 10 or the user terminal 20 in the past. For example, the price of the user information may be calculated based on the rank of the information provider or the information user according to a use frequency of the information distribution system 1. In the third embodiment, an example where the price of the user information is calculated based on the transaction situation with respect to the provider terminal 10 or the user terminal 20 will be described. In addition, in the third embodiment, although the example where a price calculating process which is based on the transaction situation is applied to the first embodiment is illustrated, the price calculating process may also be applied to the second embodiment. In addition, a configuration of the information distribution system 1 according to the third embodiment is the same as that of the example illustrated in FIG. 1, and thus, the description thereof is omitted hereinafter.

1. Configuration of Information Transaction Apparatus

Figure 9:
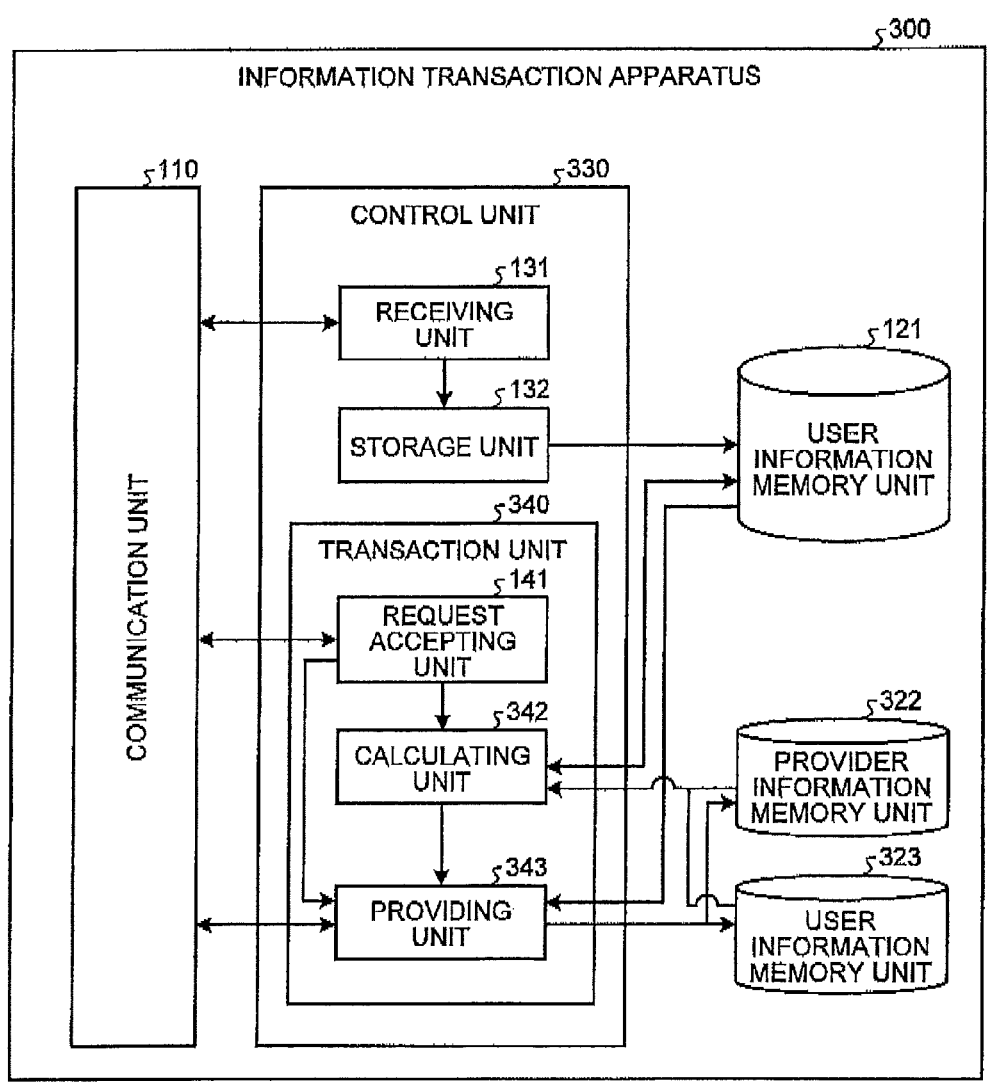
FIG. 9 is a diagram illustrating a configuration example of an information transaction apparatus according to a third embodiment.

First, a configuration of an information transaction apparatus 300 according to the third embodiment will be described with reference to FIG. 9. FIG. 9 is a diagram illustrating a configuration example of the information transaction apparatus 300 according to the third embodiment. As illustrated in FIG. 9, the information transaction apparatus 300 is configured to include a provider information memory unit 322, a user information memory unit 323, and a control unit 330.

The provider information memory unit 322 stores information on an information provider which provides user information to the information transaction apparatus 300. Herein, an example of the provider information memory unit 322 according to the third embodiment is illustrated in FIG. 10. In the example illustrated in FIG. 10, the provider information memory unit 322 has items of "provider identifier", "providing count", and "provider rank".

The "provider identifier" corresponds to the provider identifier illustrated in FIG. 4. The "providing count" represents the number of times of providing of the user information of the provider terminal 10 (namely, information provider) identified by the provider identifier to the user terminal 20. In addition, the "providing count" may be the number of pieces of the user information provided to the user terminal 20. The "provider rank" is determined according to the transaction situation and represents the rank of the information provider. In other words, the "provider rank" corresponds to the transaction situation representing the situation where the user information and the reward are transacted between the information transaction apparatus 300 and the provider terminal 10 in the past. More specifically, in the "provider rank", a higher value is stored as the providing count becomes larger, and a lower value is stored as the providing count becomes smaller. In the "provider rank" illustrated in FIG. 10, the rank indicated by 5 levels of "1" to "5" is stored. In the example herein, the provider rank "1" represents the lowest rank, and the provider rank "5" represents the highest rank.

Namely, FIG. 10 illustrates an example where the user information of the information provider identified by provider identifier "U01" is provided 200 times to the user terminal 20 by the information transaction apparatus 300. In addition, FIG. 10 illustrates an example where the rank of the information provider identified by the provider identifier "U01" is highest "5".

The user information memory unit 323 stores information on the information user which acquires the user information from the information transaction apparatus 300. Herein, an example of the user information memory unit 323 according to the third embodiment is illustrated in FIG. 11. In the example illustrated in FIG. 11, the user information memory unit 323 has items of "user identifier", "using count", and "user rank".

The "user identifier" represents identification information for identifying the user terminal 20 or the information user. The "using count" represents the number of times of using of the information transaction apparatus 300 by the user terminal 20 (namely, information user) identified by the user identifier. In addition, the "using count" may be the number of pieces of the user information acquired by the user terminal 20 from the information transaction apparatus 300 or may be the number of acquisition of the user information from the information transaction apparatus 300. The "user rank" is determined according to the transaction situation and represents the rank of the information user. In other words, the "user rank" corresponds to a transaction situation representing a situation where the user information and the usage fee are transacted between the information transaction apparatus 300 and the user terminal 20 in the past. More specifically, in the "user rank", a larger value is stored as the using count becomes larger, and a smaller value is stored as the using count becomes smaller. In the "user rank" illustrated in FIG. 11, the rank indicated by 5 levels of "1" to "5" is stored. In the example herein, it is assumed that the user rank "1" represents the lowest rank, and the user rank "5" represents the highest rank.

Namely, FIG. 11 illustrates an example where the information transaction apparatus 300 uses the user information 15 times through the user terminal 20 identified by the user identifier "R01". In addition, FIG. 11 illustrates an example where the rank of the information user identified by the user identifier "R01" is highest "S".

Returning to the description of FIG. 9, the control unit 330 is configured to include a transaction unit 340 to implement or execute functions or operations of the information process described hereinafter. In addition, the internal configuration of the control unit 330 is not limited to the configuration illustrated in FIG. 9, but any other configurations which perform the information process described hereinafter may be used. In addition, a connection relation between processing units included in the control unit 330 is not limited to the connection relation illustrated in FIG. 9, but other connection relations may be used.

As illustrated in FIG. 9, the transaction unit 340 is configured to include a calculating unit 342 and a providing unit 343. Similarly to the calculating unit 142 according to the first embodiment, the calculating unit 342 evaluates market situations of the respective pieces of the user information by using the factor information (namely, providing count) stored in the user information memory unit 121 and calculates the price of the respective pieces of the user information based on the market situations as a result of the evaluation. In addition, the calculating unit 342 evaluates transaction situation representing a situation where the user information is transacted with respect to the provider terminal 10 or the user terminal 20 in the past and calculates the price of the user information provided to the user terminal 20 according to the evaluated transaction situation. More specifically, by referring to the provider rank stored in the provider information memory unit 322, the calculating unit 342 calculates the price of the user information to be higher as the user information corresponds to the information provider which provides the user information to the user terminal 20 at a larger providing count in the past. In addition, by referring to the user rank stored in the user information memory unit 323, the calculating unit 342 calculates the price of the user information to be lower as the user information is provided to the user terminal 20 to which the user information is provided at a larger providing count in the past.

As described more in detail, the calculating unit 342 acquires the provider rank of the information provider which is a transmission source of the user-information corresponding to the acquisition request from the provider information memory unit 322. Next, the calculating unit 342 calculates the user information to be higher as the provider rank becomes higher and calculates the user information to be lower as the provider rank becomes lower. Namely, the calculating unit 342 evaluates the value of the user information corresponding to the information provider to be higher as the information provider provides the user information to the information user at a larger providing count and calculates the price of the user information by adding a premium. In addition, the calculating unit 342 acquires the user rank of the information user which is a transmission source of the acquisition request from the user information memory unit 323. Next, the calculating unit 342 calculates the user information to be lower as the user rank becomes higher and calculates the user information to be higher as the user rank becomes lower. Namely, the calculating unit 342 calculates the usage fee by applying a discount with respect to the information user which acquires the user information from the information transaction apparatus 300 at a large using count.

Herein, the operator or the like of the information transaction apparatus 300 may gain, as a commission, an amount of money obtained by subtracting the reward paid to the information provider from the usage fee gained from the information user. The calculating unit 342 according to the third embodiment may determine a discount rate according to the user rank and a premium rate according to the provider rank so that an amount of money obtained by subtracting the reward paid to the information provider of which provider rank is highest (in the above-described example, "5") from the usage fee gained from the information user of which user rank is highest (in the above-described example, "5") becomes 0 or more so as for the operator or the like of the information transaction apparatus 300 not to be in deficit.

Similarly to the providing unit 143 according to the first embodiment, the providing unit 343 provides the user information to the user terminal 20. In addition, in a case where the providing unit 343 provides the user information to the user terminal 20, the providing unit 343 adds "1" to the providing count of the provider information memory unit 322 corresponding to the information provider which is a transmission source of the user information. In addition, in a case where the providing unit 343 provides the user information to the user terminal 20, the providing unit 343 adds "1" to a using count of the user information memory unit 323 corresponding to the information user which is a providing destination.

In addition, every time when the providing unit 343 updates the providing count of the provider information memory unit 322, the providing unit 343 may update the provider rank of the provider information memory unit 322 based on the updated providing count. Alternatively, the providing unit 343 may periodically update the provider rank of the provider information memory unit 322. In addition, every time when the providing unit 343 updates the using count of the user information memory unit 323, the providing unit 343 may update the user rank of the user information memory unit 323 based on the updated using count. Alternatively, the providing unit 343 may periodically update the user rank of the user information memory unit 323.

2. Effect

As described above, the information transaction apparatus 300 according to the third embodiment calculates the price of the user information to be relatively higher as the user information corresponds to the information provider which provides the user information to the user terminal 20 at a-larger providing count in the past. In addition, the information transaction apparatus 300 calculates the price of the user information to be lower as the user information is provided to the user terminal 20 to which the user information is provided at a larger providing count in the past.

Accordingly, since the information transaction apparatus 300 according to the third embodiment may provide discounting service or the like according to the use frequency of the information transaction apparatus 300, it is possible to promote an increase in the number of users of the information transaction apparatus 300.

3. Modified Example

In the third embodiment described above, the example where the provider rank which is an example of the transaction situation is determined according to the providing count (the number of times of providing of the user information to the user terminal 20) of the provider information memory unit 322 is illustrated. However, the present invention is not limited to the example, but the provider rank may be determined according to the number of information users which become the providing destinations of the user information. In addition, for example, the provider rank may be determined according to the number of information users which are requested to provide the user information. At this time, the provider rank may be determined according to the number of information users in the manner where the same information users are counted to be "1".

In addition, in the third embodiment described above, the providing count of the provider information memory unit 322 may be the number of times of providing of the user information from the provider terminal 10 to the information transaction apparatus 300 or the number of pieces of the user information provided from the provider, terminal 10 to the information transaction apparatus 300.

In addition, in the third embodiment described above, the example where the provider rank is determined according to "providing count" of the provider information memory unit 322 is illustrated. However, the provider rank may be determined according to user attributes of the information provider instead of the providing count. For example, the provider rank may be determined according to age, residence, occupation, family structure, gender, or the like of the information provider. As described in an example, in a case where there are a small number of old persons among the information providers using the information transaction apparatus 300, since the older person provides the user information having the higher rarity value, the higher provider rank may be set to the older person. Similarly, the higher provider rank may be set to the information provider having user attributes such as residence, occupation, or family structure having the higher rarity value.

Fourth Embodiment

In the first to third embodiments described above, the examples where the information transaction apparatuses 100, 200, and 300 retain the user information are illustrated. However, the user information may be retained in the provider terminal 10 but not retained in the information transaction apparatus 100 or the like. In a fourth embodiment, an example where the user information is retained by the provider terminal 10 will be described. In addition, in the fourth embodiment, although the example where the aspect where the provider terminal 10 retains the user information is applied to the first embodiment is illustrated, the aspect may also be applied to the second or third embodiment.

1. Information Transaction Process

Figure 12:
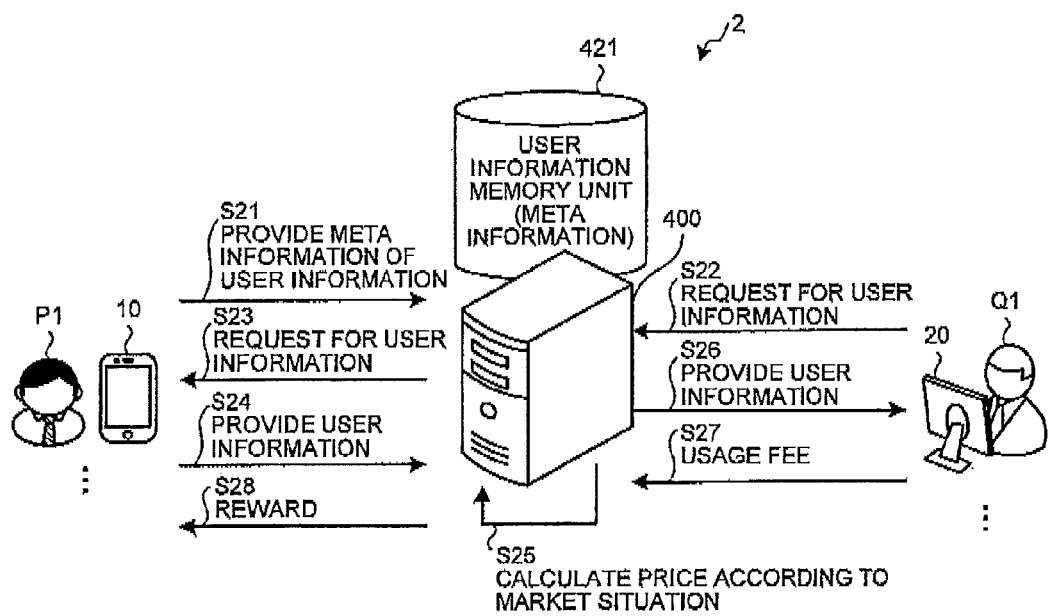
FIG. 12 is a diagram illustrating an example of an information transaction process according to a fourth embodiment.

First, an example of the information transaction process according to the fourth embodiment will be described with reference to FIG. 12. FIG. 12 is a diagram illustrating the example of the information transaction process according to the fourth embodiment. In FIG. 1, the information transaction process will be described by exemplifying an information distribution system 2.

As illustrated in FIG. 12, the information distribution system 2 is configured to include a provider terminal 10, a user terminal 20, and an information transaction apparatus 400. In the example illustrated in FIG. 12, instead of the user information, the provider terminal 10 transmits meta information on the user information to the information transaction apparatus 400 (step S21). Herein, the meta information is, for example, a type of the user information which can be acquired in the provider terminal 10, an acquisition period during which the user information is acquired, an acquisition frequency at which the user information is acquired, or the like. In addition, the provider terminal 10 acquires the user information corresponding to the meta information which is transmitted to the information transaction apparatus 400 and stores the acquired user information in its own device (provider terminal 10).

Next, the information transaction apparatus 400 stores the meta information received from the provider terminal 10 in the user information memory unit 421. The information transaction apparatus 400 also receives the meta information from other provider terminals besides the provider terminal 10 not illustrated in FIG. 12 and stores the received meta information in the user information memory unit 421. Namely, instead of storing the user information itself, the information transaction apparatus 400 according to the fourth embodiment stores the type or the like of the user information which can be acquired from the respective provider terminals 10 in the user information memory unit 421.

Subsequently, the user terminal 20 transmits the acquisition request for the user information to the information transaction apparatus 400 according to operation of the information user Q1 (step S22).

Subsequently, in a case where the information transaction apparatus 400 accepts the acquisition request from the user terminal 20, the information transaction apparatus 400 requests the provider terminal 10 retaining the user information corresponding to the acquisition request to provide the user information based on the meta information stored in the user information memory unit 421 (step S23). Next, the provider terminal 10 provides the user information to the information transaction apparatus 400 in response to the request from the information transaction apparatus 400 (step S24).

Next, the information transaction apparatus 400 calculates the price of the user information which is to be provided to the user terminal 20 based on the factor information representing the factors which affect the value of the user information collected from the provider terminal 10. In the example of FIG. 12, the information transaction apparatus 400 calculates the price of the user information based on the market situation of the user information as an example of the factor information (step S25). Next, the information transaction apparatus 400 provides the user information collected from the provider terminal 10 to the user terminal 20 (step S26).

Next, the information user Q1 pays the price calculated as the usage fee of the user information in step S25 to the manager or the like of the information transaction apparatus 400 (step S27). Next, the manager or the like of the information transaction apparatus 400 pays, as a reward, a portion or all of the usage fee gained from the information user Q1 to the information provider P1 which is a transmission source of the user information provided to the user terminal 20 (step S28).

In this manner, it is possible for the information transaction apparatus 400 according to the fourth embodiment to allow both of the information provider P1 and the information user Q1 to gain appropriate profits. In addition, since the information transaction apparatus 400 according to the fourth embodiment does not retain the user information, it is possible to prevent a leakage of the user information. Namely, the information transaction apparatus 400 is capable of implementing an information transaction process having a high security.

2. Configuration of Information Transaction Apparatus

Figure 13:
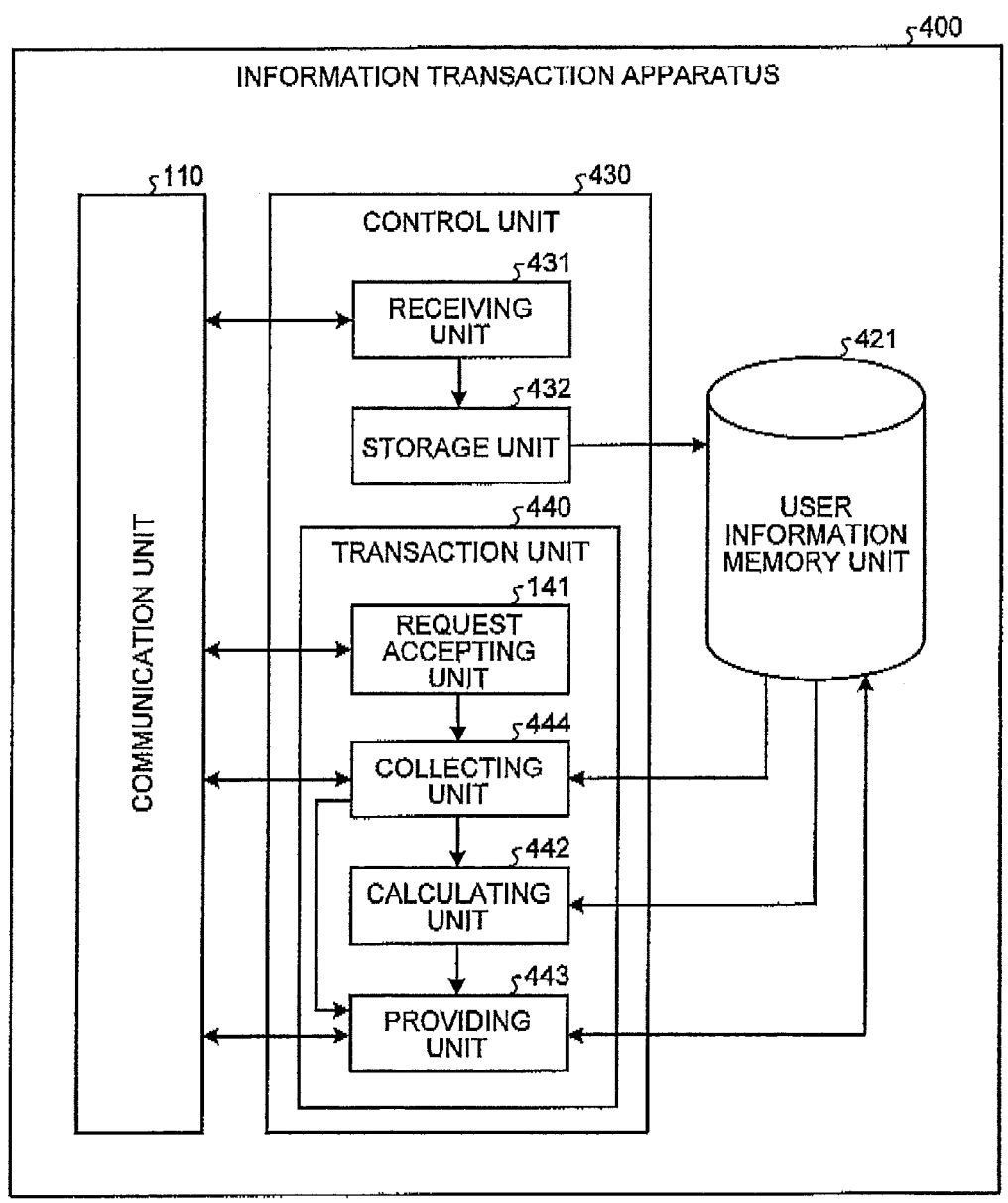
FIG. 13 is a diagram illustrating a configuration example of an information transaction apparatus according to the fourth embodiment.

Next, a configuration of the information transaction apparatus 400 according to the fourth embodiment will be described with reference to FIG. 13. FIG. 13 is a diagram illustrating a configuration example of the information transaction apparatus 400 according to the fourth embodiment. As illustrated in FIG. 13, the information transaction apparatus 400 is configured to include a user information memory unit 421 and a control unit 430.

The user information memory unit 421 stores the meta information of the user information provided from the provider terminal 10. Herein, an example of the user information memory unit 421 according to the fourth embodiment is illustrated in FIG. 14. In the example illustrated in FIG. 14, the user information memory unit 421 has items of "provider identifier", and "user information".

The "provider identifier" corresponds to the provider identifier illustrated in FIG. 4. Similarly to the example of FIG. 4, the "user information" may be divided into types of "position information", and "atmospheric pressure information". In addition, although the illustration is omitted in FIG. 14, the "user information" may have types of "sound collection information", "illuminance information", "gradient information", and the like.

In addition, the user information illustrated in FIG. 14 may be divided into items of "state", "acquisition period", "acquisition frequency", and "providing count" for each type. The "state" represents whether or not the user information is acquired by the provider terminal 10. In the example of FIG. 14, in a case where "existence" is stored in the "state", the state represents that the user information is acquired by the provider terminal 10; and in a case where "non-existence" is stored in the "state", the state represents that the user information not is acquired by the provider terminal 10. The "acquisition period" represents the period during which the user information is acquired. The "acquisition frequency" represents the time interval of acquisition of the user information. The "providing count" represents the number of times of providing of the user information to the user terminal 20 in the past.

For example, FIG. 14 illustrates an example where position information and atmospheric pressure information are stored in a provider terminal 10 corresponding to a provider identifier "U01". In addition, for example, FIG. 14 illustrates an example where the provider terminal 10 corresponding to the provider identifier "U01" acquires the position information at a time interval of 30 minutes in the year 2013. In addition, for example, FIG. 14 illustrates an example where the position information acquired by the provider terminal 10 corresponding to the provider identifier "U01" is provided 30 times in the past. In addition, for example, FIG. 14 illustrates an example where the position information is stored in the provider terminal 10 corresponding to the provider identifier "U02", but the atmospheric pressure information is not stored.

Returning to the description of FIG. 13, the control unit 430 is configured to include a receiving unit 431, a storage unit 432, and a transaction unit 440 to implement or execute functions or operations of the information process described hereinafter. In addition, the internal configuration of the control unit 430 is not limited to the configuration illustrated in FIG. 13, but any other configurations which perform the information process described hereinafter may be used. In addition, a connection relation between processing units included in the control unit 430 is not limited to the connection relation illustrated in FIG. 13, but other connection relations may be used.

The receiving unit 431 receives the meta information on the user information together with the provider identifier from the provider terminal 10. For example, the receiving unit 431 receives, as the meta information, a type of the user information which can be acquired by the provider terminal 10, an acquisition period during which the provider terminal 10 acquires the user information, an acquisition frequency at which the provider terminal 10 acquires the user information, and the like.

In addition, a timing when the provider terminal 10 transmits the meta information to the information transaction apparatus 400 may be arbitrary. In addition, the meta information which is to be transmitted by the provider terminal 10 may be set by the information provider. For example, the information provider may set or change the type, the acquisition period, or the acquisition frequency of the user information which is an acquisition object. Therefore, the provider terminal 10 may transmit the meta information to the information transaction apparatus 400 according to operation of the information provider.

The storage unit 432 stores the meta information received by the receiving unit 431 in the user information memory unit 421. More specifically, the storage unit 432 stores the meta information in the user information memory unit 421 in correspondence with the provider identifier received by the receiving unit 431.

As illustrated in FIG. 13, the transaction unit 440 is configured to include a collecting unit 444, a calculating unit 442, and a providing unit 443. In a case where the acquisition request for the user information is accepted by the request accepting unit 141, the collecting unit 444 acquires the user information corresponding to the acquisition request from the provider terminal 10. More specifically, the collecting unit 444 specifies the provider identifier which retains the user information corresponding to the acquisition request and requests the provider terminal 10 corresponding to the specified provider identifier to provide the user information based on the meta information stored in the user information memory unit 421. Accordingly, the collecting unit 444 collects the user information and the acquisition date and time of the user information from the provider terminal 10.

For example, it is assumed that "pieces of the position information corresponding to 100 persons" are requested according to the acquisition request. In this case, the collecting unit 444 specifies 100 provider identifiers where "existence" is stored in the "state" corresponding to the position information of the user information memory unit 421 and collects the position information from the respective provider terminals 10 corresponding to the specified provider identifiers.

In addition, for example, it is assumed that the "pieces of the position information corresponding to 100 persons acquired in the year 2013" are requested according to the acquisition request. In this case, the collecting unit 444 specifies 100 provider identifiers where a period including "2013" is stored in the "acquisition period" corresponding to the position information of the user information memory unit 421 and collects the position information from the respective provider terminals 10 corresponding to the specified provider identifiers.

In addition, for example, it is assumed that the position information for 100 persons which is acquired at a higher frequency than every one hour is requested according to the acquisition request. In this case, the collecting unit 444 specifies 100 provider identifiers where the information having the higher frequency than "every one hour" is stored in "acquisition frequency" corresponding to the position information of the user information memory unit 421 and collects the position information from the respective provider terminals 10 corresponding to the specified provider identifiers.

The calculating unit 442 calculates the price of the user information provided to the user terminal 20 based on the providing count which is factor information stored in the user information memory unit 421. More specifically, the calculating unit 442 calculates the price of the user information based on the "providing count" corresponding to the provider terminal 10 (namely, provider identifier) from which the user information is collected by the collecting unit 444. For example, the calculating unit 442 evaluates that the needs for the information provider are higher as the "providing count" has the larger value and evaluates that the needs for the information provider are lower as the acquired "providing count" has the smaller value. Next, the calculating unit 442 calculates the price of the user information to be higher as a larger number of pieces of the user information for which needs are high are included in the user information corresponding to the acquisition request and calculates the price of the user information to be lower as a larger number of pieces of the user information for which needs are low are included in the user information corresponding to the acquisition request.

In addition, it is considered that the request with respect to the information provider is determined according to the acquisition period or the acquisition frequency which is the meta information. More specifically, the request from the information user is more highly likely to be satisfied as the acquisition period is longer, and the request from the information user is more highly likely to be satisfied as the acquisition frequency is higher. Therefore, the request with respect to the respective information providers is changed according to the acquisition period or the acquisition frequency.

In addition, similarly to the calculating unit 142 according to the first embodiment, the calculating unit 442 calculates the amount of reward which is to be paid to the information provider, which is a transmission source of the user information provided to the user terminal 20, according to the above-described factor information. More specifically, the calculating unit 442 calculates the amounts of rewards which are to be shared among the information providers according to degrees of contribution of the respective information providers with respect to the usage fee which is to be charged to the information user.

The providing unit 443 provides the user information collected by the collecting unit 444 to the user terminal 20 which is a transmission source of the acquisition request accepted by the request accepting unit 141. More specifically, the providing unit 443 notifies the price of the user information calculated by the calculating unit 442 to the user terminal 20 and provides the user information corresponding to the acquisition request to the user terminal 20. Next, the providing unit 443 adds "1" to the providing count of the user information provided to the user terminal 20 among the providing counts corresponding to the respective pieces of the user information stored in the user information memory unit 421. In addition, the providing unit 443 notifies the amounts of rewards for the respective information providers calculated by the calculating unit 442 to the provider terminals 10.

In addition, after notifying the price of the user information calculated by the calculating unit 442 to the user terminal 20, in the case of receiving a notice indicating approval of payment of the price from the user terminal 20, the providing unit 443 may provide the user information corresponding to the acquisition request to the user terminal 20.

In addition, before the user information is collected by the collecting unit 444, the above-described calculating unit 442 may calculate the price of the user information provided to the user terminal 20. More specifically, the calculating unit 442 calculates the price of the user information based on the factor information (namely, providing count) stored in the user information memory unit 421 at the time when the provider terminal 10 which is an object of collection of the user information by the collecting unit 444 is specified. In this case, in the case of receiving the notice indicating approval of payment of the price of the user information calculated by the calculating unit 442 from the user terminal 20, the providing unit 443 may instruct the collecting unit 444 to collect the user information and may provide the user information collected by the collecting unit 444.

3. Effect

As described above, since the information transaction apparatus 400 according to the fourth embodiment does not retain the user information, it is possible for the information transaction apparatus 400 to allow both of the information provider and the information user to gain appropriate profits and to implement an information transaction process having a high security.

4. Modified Example

In addition, in the fourth embodiment described above, the provider terminal 10 may transmit information other than the "state", the "acquisition period", and the "acquisition frequency" as the meta information to the information transaction apparatus 400. For example, the provider terminal 10 may transmit local place information on the local place where the user information is acquired or the like as the meta information to the information transaction apparatus 400. In this case, the information transaction apparatus 400 stores the local place information or the like in the user information memory unit 421. Next, in a case where the specifying information specifying the local place is included in the acquisition request, the information transaction apparatus 400 collects the user information from the provider terminal 10 satisfying the specifying information.

In addition, in the fourth embodiment described above, although the example where the information transaction apparatus 400 is applied to the first embodiment is illustrated, the information transaction apparatus 400 may also be applied to the second or third embodiment. For example, similarly to the information transaction apparatus 200 according to the second embodiment, the information transaction apparatus 400 may use the accuracy, the granularity, the rarity, or the like as the factor information. In this case, when the information transaction apparatus 400 collects the user information from the provider terminal 10, the information transaction apparatus 400 evaluates the accuracy, the granularity, or the rarity and calculates the price of the user information based on a result of the evaluation.

In addition, in the fourth embodiment described above, similarly to the example illustrated in FIG. 14, the example where the user information memory unit 421 stores the user information for each contractor identifier is illustrated, but the present invention is not limited to the example. For example, similarly to the example illustrated in FIG. 4, the user information memory unit 421 may store the user information illustrated in FIG. 14 in correspondence with the acquisition date and time and the contractor identifier. In this case, the information transaction apparatus 400 may update the user information memory unit 421 by periodically receiving the type and the acquisition date and time of the user information acquired by the provider terminal 10 from the provider terminal 10.

Other Embodiments

The embodiments described above may be embodied as various other aspects besides the embodiments described above. Therefore, hereinafter, other embodiments will be described. In addition, even in a case where other embodiments are described by exemplifying the information transaction apparatus 100 hereinafter, other embodiment described hereinafter may also be applied to the information transaction apparatuses 200, 300, and 400.

1. Calculating Process

The first to fourth embodiments described above may be combined. More specifically, the information transaction apparatus 100 may calculate the price of the user information by using a portion or all of "market situation", "accuracy", "granularity", "rarity", "freshness", "collection period", "combination of types of the user information which is an acquisition object", "provider rank", and "user rank" as the factor information which affects the value of the user information. In addition, in the case of using plural pieces of the factor information, the information transaction apparatus 100 may calculate the price of the user information by using a weight of each piece of the factor information according to a degree of importance.

2. Processing

In addition, instead of providing the user information itself stored in the user information memory unit 121, the above-described information transaction apparatus 100 may process the user information and, after that, may provide the processed user information to the user terminal 20. For example, the information transaction apparatus 100 may obtain population distribution of each local place based on the position information, or may obtain noise distribution or the like of each local place based on the position information and the sound collection information, or may provide the population distribution, the noise distribution, or the like to the user terminal 20. In addition, in a case where the information transaction apparatus 100 provides the processed user information to the user terminal 20, the information transaction apparatus 100 may calculate the price of the user information to be relatively high.

3. Consent of Information Provider

In addition, only after the above-described information transaction apparatus 100 obtains the consent of the information provider, the information transaction apparatus 109 may also provide the user information to the information user. More specifically, the information transaction apparatus 100 receives the permission information indicating that the user information is permitted to be provided to the user terminal 20 from the provider terminal 10 in advance and provides the user information to the user terminal 20 based on the received permission information.

Herein, the permission information which the information transaction apparatus 100 receives from the provider terminal 10 may have an arbitrary format. For example, the information transaction apparatus 100 receives the permission information indicating that the user information is permitted to be unconditionally provided to the user terminal 20 from the provider terminal 10. In this case, the information transaction apparatus 100 unconditionally provides the user information corresponding to the provider terminal 10 to the user terminal 20. In addition, for example, the information transaction apparatus 100 receives the permission information including the type of the user information which is permitted to be provided to the user terminal 20 from the provider terminal 10. In this case, the information transaction apparatus 100 provides only the user information corresponding to the type included in the permission information to the user terminal 20. In addition, for example, the information transaction apparatus 100 receives the permission information including the business type of the information user which is a providing source of the user information from the provider terminal 10. In this case, the information transaction apparatus 100 retains the business types of the respective information users in advance or receives the business type of the information user together with the acquisition request for the user information from the user terminal 20. Next, in a case where the business type included in the permission information and the business type of the information user are coincident with each other, the information transaction apparatus 100 provides the user information corresponding to the provider terminal 10 which transmits the permission information to the user terminal 20.

In addition, the timing when the information transaction apparatus 100 receives the permission information may be arbitrary. For example, the information transaction apparatus 100 receives the permission information from the provider terminal 10 in advance at the stage when it is determined that the provider terminal 10 uses the information transaction apparatus 100. In this case, the information transaction apparatus 100 provides the user information corresponding to the provider terminal 10 to the user terminal 20 based on the permission information which is received in advance. In addition, for example, every time when the information transaction apparatus 100 provides the user information to the user terminal 20, the information transaction apparatus 100 sends inquiries to the provider terminal 10 to receive the permission information from the provider terminal 10. In this case, only after the information transaction apparatus 100 can receive the permission information from the provider terminal 10, the information transaction apparatus 100 provides the user information to the user terminal 20 based on the received permission information.

4. Public Transaction

In addition, in the embodiment described above, the example where, in a case where the information transaction apparatus 100 accepts the acquisition request from the user terminal 20, the information transaction apparatus 100 provides the user information corresponding to the acquisition request and the price thereof to the user terminal 20 is illustrated. However, the present invention is not limited to the example, but the information transaction apparatus 100 may periodically calculate the price of the user information and publishes the calculated price of the user information. At this time, the information transaction apparatus 100 may publish the period during which the user information can be purchased at the published price. In this case, the information user may determine whether or not to purchase the user information by referring to the price which is published by the information transaction apparatus 100. In addition, in a case where the transaction manner is applied to the third embodiment, the price of the user information is changed according to the user rank. Therefore, for example, the information transaction apparatus 300 may publish the price for an information user of which user rank is worst and may publish the message indicating that the price is likely to be discounted according to the use frequency of the information transaction apparatus 300.

5. User Information

In addition, in the embodiments described above, although the position information, the atmospheric pressure information, the sound collection information, the illuminance information, the gradient information, and the like are exemplified as the user information, the example of the user information is not limited thereto. For example, the user information may be personal information (for example, "age", "occupation", "annual income", and the like) of the information provider.

6. Others

In addition, among the processes described in the above-described embodiments, all or a portion of the processes which are described to be automatically performed may be manually performed, or all or a portion of the processes which are described to be manually performed may be automatically performed by using a well-known method. Besides, the information including procedures of processes, specific names, and various types of data or parameters illustrated in this document and the drawings may be arbitrarily modified except for the case where there is particular description. For example, various types of information illustrated in each figure are not limited to the illustrated information.

In addition, each component of each device illustrated is a functional, conceptual component, and thus, it is not necessarily configured to be physically the same as illustrated. Namely, the specific form of the distribution/integration of the devices is not limited to the illustrated ones, but all or a portion thereof may be configured to be functionally or physically distributed or integrated in arbitrary units according to various types of loads, use situations, or the like. For example, the user information memory unit 121 illustrated in FIG. 3 may not be retained in the information transaction apparatus 100, but it may be retained in a storage server or the like (not illustrated). In this case, the information transaction apparatus 100 acquires the user information or the like from the storage server.

7. Hardware Configuration

Figure 15:
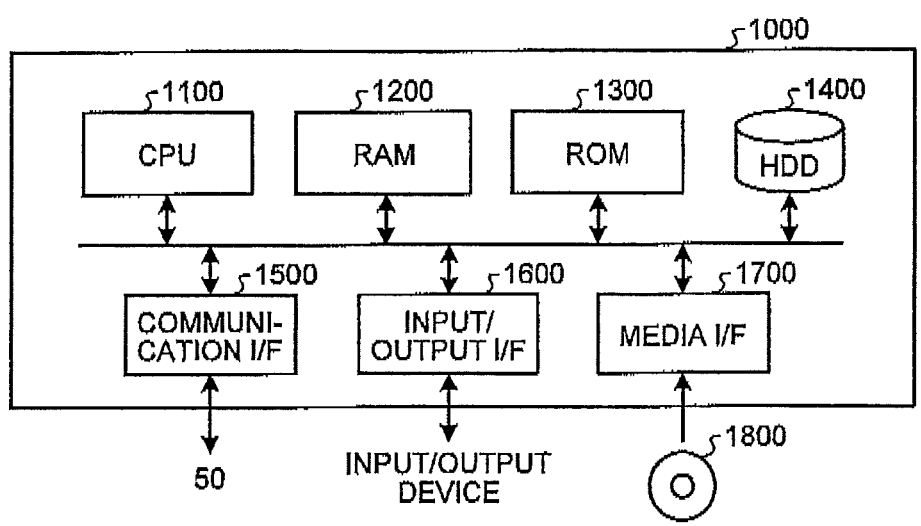
FIG. 15 is a hardware configuration diagram illustrating an example of a computer implementing functions of an information transaction apparatus.

In addition, the information transaction apparatuses 100, 200, and 300 according to the embodiments described above are embodied by a computer 1000 having a configuration illustrated in, for example, FIG. 15. Hereinafter, the description will be made by exemplifying the information transaction apparatus 100. FIG. 15 is a hardware configuration diagram illustrating an example of the computer 1000 implementing the functions of the information transaction apparatus 100. The computer 1000 is configured to include a CPU 1100, a RAM 1200, a ROM 1300, an HDD 1400, a communication interface (I/F) 1500, an input/output interface (I/F) 1600, and a media interface (I/F) 1700.

The CPU 1100 operates based on programs stored in the ROM 1300 or the HDD 1400 to perform control of each component. The ROM 1300 stores a boot program executed by the CPU 1100 at the time of starting up the computer 1000 or programs or the like depending on hardware of the computer 1000.

The HDD 1400 stores the program executed by the CPU 1100 and data and the like used by the program. The communication interface 1500 receives data from other devices through a communication network 50 to transmit the data to the CPU 1100 and transmits the data generated by the CPU 1100 to other devices through the communication network 50.

The CPU 1100 controls output devices such as a display and a printer and input devices such a keyboard and a mouse through the input/output interface 1600. The CPU 1100 acquires data from the input devices through the input/output interface 1600. In addition, the CPU 1100 outputs the generated data to the output devices through the input/output interface 1600.

The media interface 1700 reads out the programs or data stored in a recording medium 1800 and provides the program or data to the CPU 1100 through the RAM 1200. The CPU 1100 loads the program on the RAM 1200 from the recording medium 1800 through the media interface 1700 and executes the loaded program. The recording medium 1800 is, for example, an optical recording medium such as a digital versatile disc (DVD) or a phase change rewritable disk (PD), an optical magnetic recording medium such as a magneto-optical disk (MO), a tape medium, a magnetic recording medium, a semiconductor memory, or the like.

For example, in a case where the computer 1000 functions as the information transaction apparatus 100 according to the first embodiment, the CPU 1100 of the computer 1000 executes the program loaded on the RAM 1200 to implement the functions of the control unit 130. In addition, the data in the user information memory unit 121 are stored in the HDD 1400. The CPU 1100 of the computer 1000 reads out the program from the recording medium 1800 to execute. However, as another example, the program may be acquired from other devices through the communication network 50.

In addition, in a case where the computer 1000 functions as the information transaction apparatus 200 according to the second embodiment, the CPU 1100 of the computer 1000 executes the program loaded on the RAM 1200 to implement the functions of the control unit 230. In addition, the data in the user information memory unit 221 are stored in the HDD 1400.

In addition, in a case where the computer 1000 functions as the information transaction apparatus 300 according to the third embodiment, the CPU 1100 of the computer 1000 executes the program loaded on the RAM 1200 to implement the functions of the control unit 330. In addition, the data in the user information memory unit 121, the provider information memory unit 322, and the user information memory unit 323 are stored in the HDD 1400.

In addition, in a case where the computer 1000 functions as the information transaction apparatus 400 according to the fourth embodiment, the CPU 1100 of the computer 1000 executes the program loaded on the RAM 1200 to implement the functions of the control unit 430. In addition, the data in the user information memory unit 421 are stored in the HDD 1400.

Heretofore, several embodiments of the present application are described with reference to the drawings, but these embodiments are exemplary ones. The present invention can be embodied in other forms obtained by performing various changes or modifications on the aspects disclosed in "Summary of the Invention" based on knowledge of the ordinarily skilled in the art.

In addition, the "unit (section, module, and unit)" described above may be changed into a "means", a "circuit", or the like in reading. For example, a receiving unit may be changed into a "reading means" or a "reading circuit" in reading.

According to an aspect of the embodiment, it is possible to obtain an effect in that both of an information provider and an information user can gain appropriate profits.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising:
   a network interface connected to both a provider terminal used by the information provider and a user terminal used by an information user so that the apparatus is configured to communicate with the provider terminal and the user terminal;
   a memory; and
   a processor operatively connected to the network interface and memory, the processor being programmed to:
   (a) receive, at the apparatus from the provider terminal over a network, meta information associated with user information on an information provider or the provider terminal using at least one sensor on the provider terminal, the meta information including (i) a type of the user information acquired from the at least one sensor at a location of the provider terminal, (ii) an acquisition period during which the user information is acquired, and (iii) an acquisition frequency at which the user information is acquired;
   (b) store, in the memory of the apparatus, the meta information; and (c) receive, from the user terminal over the network, a first acquisition request for the user information corresponding to the type;

(d) calculate, at the apparatus, a price of the user information based on factor information which affects a value of the user information, the factor information including at least one of the acquisition period and the acquisition frequency;

(e) in response to accepting the acquisition request: (i) transmit, from the apparatus to the provider terminal over the network, a second acquisition request for the user information corresponding to the type, (ii) receive, at the apparatus from the user terminal over the network, the user information corresponding to the type (iii) transmit, from the apparatus to the user terminal over the network, the user information corresponding to the type, and (iv) transmit, from the apparatus to the provider terminal over the network, a reward for the information provider which is a transmission source of the provided user information based on the calculated price.

2. The apparatus according to claim 1, wherein the processor evaluates a market situation of the received user information as the factor information and calculates the price of the user information provided to the user terminal based on the evaluated market situation.

3. The apparatus according to claim 2, wherein the processor evaluates the market situation according to a degree of demand or a degree of supply with respect to the user information corresponding to the first acquisition request.

4. The apparatus according to claim 1, wherein the processor evaluates feature information representing features of the received user information as the factor information and calculates the price of the user information provided to the user terminal based on the evaluated feature information.

5. The apparatus according to claim 4, wherein the processor calculates the price of the user information by using at least one of accuracy representing an accuracy of the user information, granularity representing a degree of detail of the user information, rarity representing a rarity value of the user information, freshness based on an acquisition date and time when the user information is acquired, and a collection period where the user information is collected as the feature information of the received user information.

6. The apparatus according to claim 1,
wherein the processor calculates the price of the user information based on a combination of each type of the user information requested according to the first acquisition request.

7. The apparatus according to claim 1, wherein the processor evaluates a transaction situation representing a situation where the user information is transacted at a past time with respect to the provider terminal or the user terminal as the factor information and calculates a price of the user information provided to the user terminal based on the evaluated transaction situation.

8. The apparatus according to claim 7, wherein the processor calculates the price of the user information corresponding to the provider terminal according to the transaction situation representing the situation where the user information is transacted with respect to the provider terminal at the past time.

9. The apparatus according to claim 7, wherein the processor calculates the price of the user information provided to the user terminal according to the transaction situation representing the situation where the user information is transacted with respect to the user terminal at the past time.

10. The apparatus according to claim 1, wherein the processor dynamically evaluates the factor information at a time when the acquisition request is accepted and calculates the price of the user information provided to the user terminal based on the evaluated factor information.

11. The apparatus according to claim 1, wherein the processor provides the user information corresponding to the first acquisition request to the user terminal in a case of receiving a notice indicating approval of payment of the price calculated from the user terminal.

12. A method executed by a computer, the method comprising:
receiving, at a computer from a provider terminal used by an information provider over a network, user information on the information provider or the provider terminal using at least one sensor on the provider terminal, the meta information including (i) a type of the user information acquired from the at least one sensor at a location of the provider terminal, (ii) an acquisition period during which the user information is acquired, and (iii) an acquisition frequency at which the user information is acquired;
storing, in memory of the computer, the meta information;
receiving, at the computer from a user terminal used by an information user over the network, a first acquisition request for the user information corresponding to the type; and
calculate, at the computer, a price of the user information based on factor information which affects a value of the user information, the factor information including at least one of the acquisition period and the acquisition frequency;
in response to accepting the first acquisition request for the user information from a user terminal used by an information user; (i) transmitting, from the computer to the provider terminal over the network, a second acquisition request for the user information corresponding to the type, (ii) receiving, at the computer from the user terminal over the network, the user information corresponding to the type; (iii) transmitting, from the computer to the user terminal over the network, the user information corresponding to the type and (iv) transmitting, from the computer to the provider terminal over the network, a reward for the information provider which is a transmission source of the provided user information based on the calculated price.

13. A non-transitory computer readable storage medium containing program instructions, wherein execution of the program instructions by one or more processors of a computer system causes the one or more processors to perform:
receiving, at a computer from a provider terminal used by an information provider over a network, user information on the information provider or the provider terminal using at least one sensor on the provider terminal, the meta information including (i) a type of the user information acquired from the at least one sensor at a location of the provider terminal, (ii) an acquisition period during which the user information is acquired, and (iii) an acquisition frequency at which the user information is acquired;
storing, in memory of the computer, the meta information;

receiving, at the computer from a user terminal used by an information user over the network, a first acquisition request for the user information corresponding to the type; and calculate, at the computer, a price of the user information based on factor information which affects a value of the user information, the factor information including at least one of the acquisition period and the acquisition frequency;

in response to accepting the acquisition request: (i) transmitting, from the computer to the provider terminal over the network, a second acquisition request for the user information corresponding to the type, (ii) receiving, at the computer from the user terminal over the network, the user information corresponding to the type; (iii) transmitting, from the computer to the user terminal over the network, the user information corresponding to the type and (iv) transmitting, from the computer to the provider terminal over the network, a reward for the information provider which is a transmission source of the provided user information based on the calculated price.

* * * * *